United States Patent
Zhao et al.

(10) Patent No.: US 11,917,203 B2
(45) Date of Patent: Feb. 27, 2024

(54) NON-SEPARABLE TRANSFORM METHOD AND DEVICE

(71) Applicant: HUAWEI TECHNOLOGIES CO., LTD., Shenzhen (CN)

(72) Inventors: Yin Zhao, Hangzhou (CN); Haitao Yang, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 245 days.

(21) Appl. No.: 17/561,184

(22) Filed: Dec. 23, 2021

(65) Prior Publication Data

US 2022/0116661 A1    Apr. 14, 2022

Related U.S. Application Data

(63) Continuation of application No. PCT/CN2020/096048, filed on Jun. 15, 2020.

(30) Foreign Application Priority Data

Jun. 25, 2019  (CN) .......................... 201910556271.8

(51) Int. Cl.
*H04N 19/61* (2014.01)
*H04N 19/159* (2014.01)
(Continued)

(52) U.S. Cl.
CPC .......... *H04N 19/61* (2014.11); *H04N 19/159* (2014.11); *H04N 19/176* (2014.11); *H04N 19/18* (2014.11); *H04N 19/186* (2014.11)

(58) Field of Classification Search
None
See application file for complete search history.

(56) References Cited

U.S. PATENT DOCUMENTS

| | | | |
|---|---|---|---|
| 2017/0094313 A1* | 3/2017 | Zhao | H04L 43/16 |
| 2022/0109876 A1* | 4/2022 | Zhang | H04N 19/61 |
| 2022/0159300 A1* | 5/2022 | Chiang | H04N 19/12 |

FOREIGN PATENT DOCUMENTS

| | | |
|---|---|---|
| CN | 108141597 A | 6/2018 |
| CN | 109076222 A | 12/2018 |

(Continued)

OTHER PUBLICATIONS

Document: JVET-N0193, Moonmo Koo et al, CE6: Reduced Secondary Transform (RST) (CE6-3.1), Joint Video Experts Team (JVET) of ITU-T SG 16 WP 3 and ISO/IEC JTC 1/SC 29/WG 11, 14th Meeting: Geneva, CH, Mar. 19-27, 2019, total 19 pages.

(Continued)

*Primary Examiner* — Talha M Nawaz
(74) *Attorney, Agent, or Firm* — HAUPTMAN HAM, LLP

(57) ABSTRACT

A method includes parsing a transform coefficient of a transform block in a current coding unit to obtain a first transform coefficient matrix. The method also includes obtaining a quantity K of non-zero transform coefficients in a top-left preset region of the first transform coefficient matrix. The method also includes parsing an index value based on the quantity K being greater than a threshold. The method also includes determining a transform matrix based on the index value. The method also includes multiplying N transform coefficients of the first transform coefficient matrix by the transform matrix to obtain M transform coefficients. The method also includes updating the first transform coefficient matrix by using the M transform coefficients to obtain a second transform coefficient matrix. The method also includes performing an inverse transform on the second transform coefficient matrix to obtain residual samples of the current coding unit.

20 Claims, 8 Drawing Sheets

(51) Int. Cl.
*H04N 19/176* (2014.01)
*H04N 19/18* (2014.01)
*H04N 19/186* (2014.01)

(56) References Cited

FOREIGN PATENT DOCUMENTS

| CN | 109076230 A | 12/2018 |
|---|---|---|
| WO | 2018166429 A1 | 9/2018 |
| WO | 2018174402 A1 | 9/2018 |

OTHER PUBLICATIONS

ITU-T H.261 (Mar. 1993), Line Transmission of Non-Telephone Signals, Video Codec for Audiovisual Services at p x 64 kbits, total 29 pages.
ITU-T H.262 (Feb. 2012), Series H: Audiovisual and Multimedia Systems, Infrastructure of audiovisual services—Coding of moving video Information technology—Generic coding of moving pictures and associated audio Information: Video: Frame packing arrangement signalling for 3D content, total 238 pages.
ITU-T H.263(Jan. 2005), Series H: Audiovisual and Multimedia Systems, Infrastructure of audiovisual services—Coding of moving video, Video coding for low bit rate communication, total 226 pages.
ITU-T H.264(Apr. 2017), Series H: Audiovisual and Multimedia Systems, Infrastructure of audiovisual services—Coding of moving video, Advanced video coding for generic audiovisual services, total 812 pages.
ITU-T H.265(Feb. 2018), Series H: Audiovisual and Multimedia Systems Infrastructure of audiovisual services—Coding of moving video, High efficiency video coding, total 692 pages.
International Search Report issued in corresponding International Application No. PCT/CN2020/096048, dated Sep. 24, 2020, pp. 1-11.

* cited by examiner

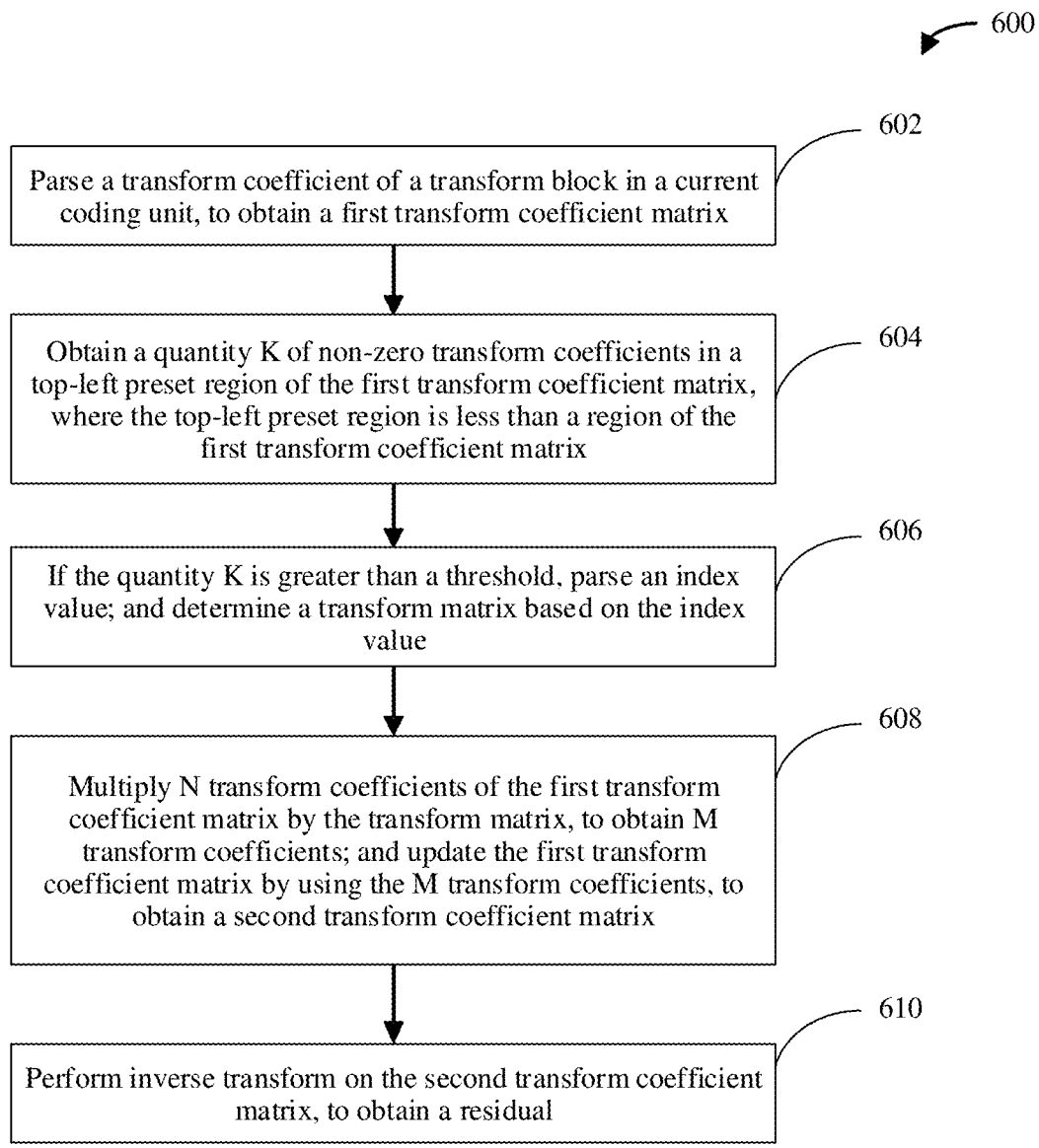

| 0 | 2 | 5 | 9 | 16 | 18 | 21 | 25 |
|---|---|---|---|---|---|---|---|
| 1 | 4 | 8 | 12 | 17 | 20 | 24 | 28 |
| 3 | 7 | 11 | 14 | 19 | 23 | 27 | 30 |
| 6 | 10 | 13 | 15 | 22 | 26 | 29 | 31 |
| 32 | 34 | 37 | 41 | 48 | 50 | 53 | 57 |
| 33 | 36 | 40 | 44 | 49 | 52 | 56 | 60 |
| 35 | 39 | 43 | 46 | 51 | 55 | 59 | 62 |
| 38 | 42 | 45 | 47 | 54 | 58 | 61 | 63 |

NON-SEPARABLE TRANSFORM METHOD AND DEVICE

CROSS-REFERENCE TO RELATED APPLICATIONS

This application is a continuation of international application PCT/CN2020/096048, filed on Jun. 15, 2020, which claims priority to Chinese Patent Application No. 201910556271.8, filed on Jun. 25, 2019. The disclosures of the aforementioned applications are hereby incorporated by reference in their entireties.

TECHNICAL FIELD

The present disclosure relates to the video coding field, and in particular, to a non-separable transform method, a corresponding encoder, and a corresponding decoder.

BACKGROUND

Digital video capabilities can be incorporated into a wide variety of apparatuses, including digital televisions, digital live broadcast systems, wireless broadcast systems, personal digital assistants (PDA), laptop or desktop computers, tablet computers, e-book readers, digital cameras, digital recording apparatuses, digital media players, video game apparatuses, video game consoles, cellular or satellite radio phones (also referred to as "smartphones"), video conferencing apparatuses, video streaming apparatuses, and the like. Digital video apparatuses implement video compression technologies, for example, video compression technologies described in standards defined by MPEG-2, MPEG-4, ITU-T H.263, and ITU-T H.264/MPEG-4 Part 10: advanced video coding (AVC), the video coding standard H.265/high efficiency video coding (HEVC) standard, H.266/VVC (Versatile Video Coding), and extensions of such standards. The video apparatuses can more efficiently transmit, receive, encode, decode, and/or store digital video information by implementing such video compression technologies.

The video compression technologies are used to perform spatial (intra-picture) prediction and/or temporal (inter-picture) prediction to reduce or remove inherent redundancy in video sequences. In block-based video coding, a video slice (that is, a video frame or a part of a video frame) may be partitioned into picture blocks, and the picture block may also be referred to as a tree block, a coding unit (CU), and/or a coding node. A picture may be referred to as a frame, and a reference picture may be referred to as a reference frame. However, it is highly complex to compute in a current method for performing non-separable transform on a primary transform coefficient obtained by performing DCT/DST transform on a prediction residual. This affects an entropy coding throughput.

SUMMARY

Embodiments of this application provide a non-separable transform method, a corresponding encoder, and a corresponding decoder, to increase a coding throughput to some extent.

According to a first aspect, an embodiment of this application provides a non-separable transform method, including:

parsing a transform coefficient of a transform block in a current coding unit, to obtain a first transform coefficient matrix; obtaining a quantity K of non-zero transform coefficients in a top-left preset region of the first transform coefficient matrix, where the top-left preset region is less than a region of the first transform coefficient matrix; if the quantity K is greater than a threshold, parsing an index value; determining a transform matrix based on the index value; multiplying N transform coefficients of the first transform coefficient matrix by the transform matrix, to obtain M transform coefficients; updating the first transform coefficient matrix by using the M transform coefficients, to obtain a second transform coefficient matrix; and performing inverse transform on the second transform coefficient matrix, to obtain a residual.

According to this embodiment of this application, the quantity K of non-zero transform coefficients in the top-left preset region of the first transform coefficient matrix is obtained, so that a calculation amount for parsing a non-separable transform index value can be reduced, and an amount of data that needs to be accessed can be reduced. Therefore, a coding throughput can be increased to some extent by implementing this application.

According to a second aspect, an embodiment of this application provides a non-separable transform method, including:

parsing a transform coefficient of a transform block in a current coding unit, to obtain a first transform coefficient matrix; obtaining a quantity K of non-zero transform coefficients in the first transform coefficient matrix; if the quantity K is greater than a threshold, parsing an index value; determining, based on an intra prediction mode corresponding to the transform block, a transform set in which a transform matrix is located, where a number of the transform set can be only one of three values; determining the transform matrix based on the index value and the number of the transform set; multiplying N transform coefficients of the first transform coefficient matrix by the transform matrix, to obtain M transform coefficients; updating the first transform coefficient matrix by using the M transform coefficients, to obtain a second transform coefficient matrix; and performing inverse transform on the second transform coefficient matrix, to obtain a residual.

According to this embodiment of this application, when the transform set in which the transform matrix is located is determined, the number of the transform set can be only one of three values. By implementing this application, a quantity of transform matrices used for non-separable transform can be reduced to some extent. This can reduce a storage amount of the transform matrix, and increase a coding throughput.

According to a third aspect, an embodiment of this application provides a non-separable transform device, including several functional units configured to implement any method according to the first aspect.

According to a fourth aspect, an embodiment of this application provides a non-separable transform device, including several functional units configured to implement any method according to the second aspect.

According to a fifth aspect, an embodiment of this application provides an encoding device, including a non-volatile memory and a processor that are coupled to each other. The processor invokes program code stored in the memory, to perform a part or all of steps of any method according to the first aspect.

According to a sixth aspect, an embodiment of this application provides an encoding device, including a non-volatile memory and a processor that are coupled to each other. The processor invokes program code stored in the memory, to perform a part or all of steps of any method according to the second aspect.

According to a seventh aspect, an embodiment of this application provides a decoding device, including a non-volatile memory and a processor that are coupled to each other. The processor invokes program code stored in the memory, to perform a part or all of steps of any method according to the first aspect.

According to an eighth aspect, an embodiment of this application provides a decoding device, including a non-volatile memory and a processor that are coupled to each other. The processor invokes program code stored in the memory, to perform a part or all of steps of any method according to the second aspect.

According to a ninth aspect, an embodiment of this application provides a computer-readable storage medium. The computer-readable storage medium stores program code, where the program code includes instructions used to perform a part or all of steps of any method according to the first aspect or the second aspect.

According to a tenth aspect, an embodiment of this application provides a computer program product. When the computer program product runs on a computer, the computer is enabled to perform a part or all of steps of any method according to the first aspect or the second aspect.

It should be understood that, the technical solutions in the third aspect to the tenth aspect of this application are consistent with the technical solution in the first aspect or the second aspect. Beneficial effects achieved in the various aspects and corresponding feasible implementations are similar, and details are not described again.

BRIEF DESCRIPTION OF DRAWINGS

To describe the technical solutions in the embodiments of the present disclosure or in the background more clearly, the following briefly describes the accompanying drawings for describing the embodiments of the present disclosure or the background.

FIG. 6 is a schematic flowchart of a low frequency non-separable transform method for implementing an embodiment of the present disclosure;

FIG. 7 shows a diagonal scan order (left) of a 4×4 transform coefficient matrix and a diagonal scan order (right) of a 4×2 transform coefficient matrix;

DESCRIPTION OF EMBODIMENTS

Figure 1A:
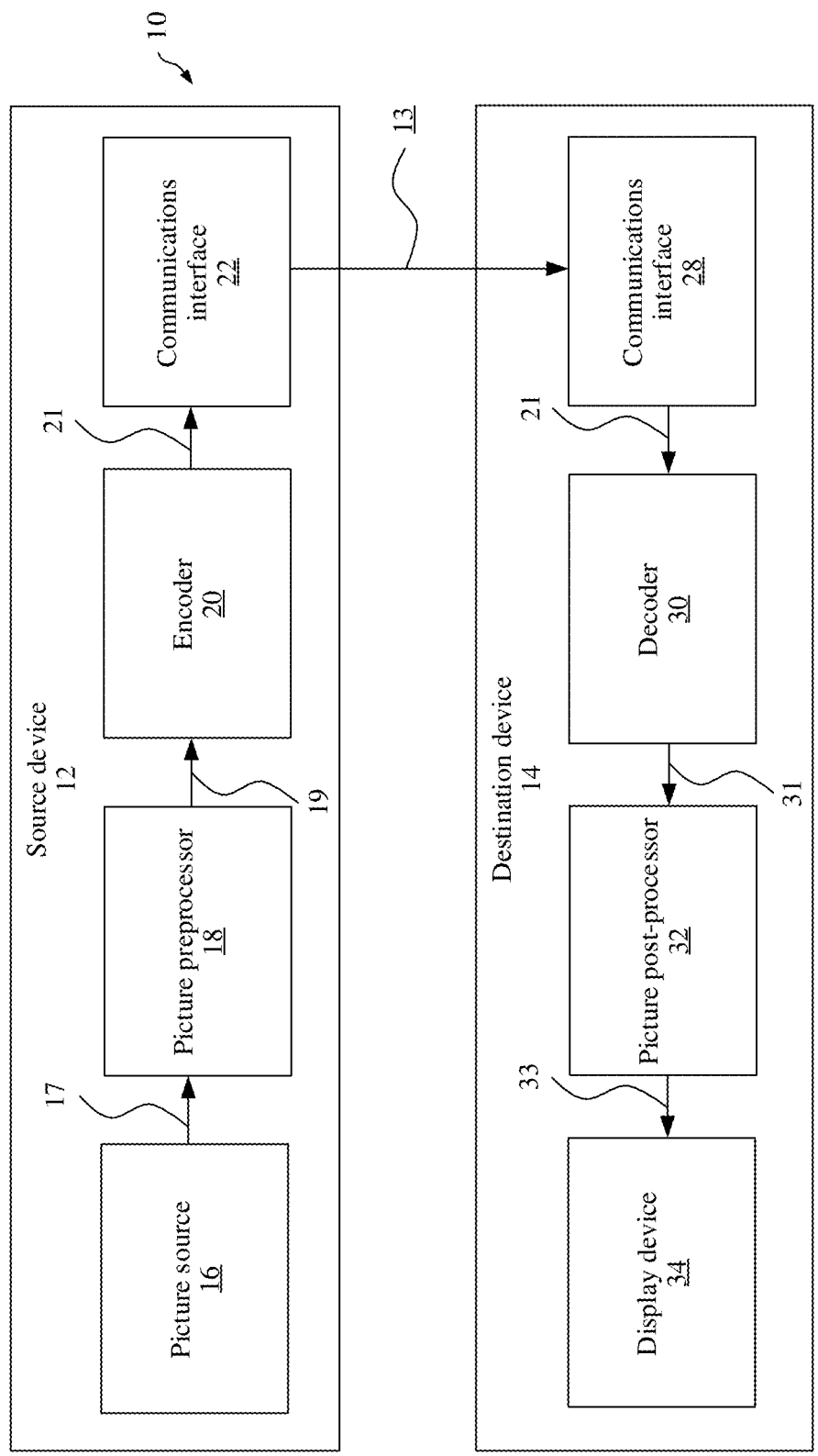
FIG. 1A is a block diagram of an example of a video encoding and decoding system 10 for implementing an embodiment of the present disclosure.

The following describes the embodiments of the present disclosure with reference to the accompanying drawings in the embodiments of the present disclosure. In the following description, reference is made to the accompanying drawings that form a part of this disclosure and show, by way of illustration, specific aspects of the embodiments of the present disclosure or specific aspects in which the embodiments of the present disclosure may be used. It should be understood that the embodiments of the present disclosure may be used in other aspects, and may include structural or logical changes not depicted in the accompanying drawings. Therefore, the following detailed description shall not be understood in a limiting sense, and the scope of the present disclosure is defined by the appended claims. For example, it should be understood that disclosed content with reference to described methods is also applicable to a corresponding device or system configured to perform the method, and vice versa. For example, if one or more specific method steps are described, a corresponding device may include one or more units such as functional units for performing the described one or more method steps (for example, one unit performs the one or more steps; or a plurality of units, each of which performs one or more of the plurality of steps), even if such one or more units are not explicitly described or illustrated in the accompanying drawings. In addition, for example, if a specific apparatus is described based on one or more units such as a functional unit, a corresponding method may include a step used to perform one or more functionalities of one or more units (for example, one step used to perform one or more functionalities of one or more units; or a plurality of steps, each of which is used to perform one or more functionalities of one or more units in a plurality of units), even if such one or more of steps are not explicitly described or illustrated in the accompanying drawings. Further, it should be understood that features of various example embodiments and/or aspects described in this specification may be combined with each other, unless otherwise specified.

The technical solutions in the embodiments of the present disclosure may not only be applied to existing video coding standards (for example, standards such as H.264 and HEVC), but also be applied to future video coding standards (for example, the H.266 standard). Terms used in the embodiments of the present disclosure are merely intended to explain specific embodiments of the present disclosure, but are not intended to limit the present disclosure. The following first briefly describes some concepts that may be used in the embodiments of the present disclosure.

Video coding typically refers to processing of a sequence of pictures, where the sequence of pictures forms a video or a video sequence. In the video coding field, the terms "picture", "frame", and "image" may be used as synonyms. Video coding used in this specification indicates video encoding or video decoding. Video encoding is performed at a source side, and typically includes processing (for example, by compression) an original video picture to reduce an amount of data for representing the video picture, for more efficient storage and/or transmission.

Video decoding is performed at a destination side, and typically includes inverse processing in comparison with an encoder to reconstruct the video picture. "Coding" of a video picture in the embodiments should be understood as "encoding" or "decoding" of a video sequence. A combination of an encoding part and a decoding part is also referred to as coding (encoding and decoding).

A video sequence includes a series of pictures, the picture is further split into slices, and the slice is further split into blocks. Video coding is performed by block. In some new video coding standards, the concept "block" is further expanded. For example, in the H.264 standard, there is a macroblock (MB), and the macroblock may be further split into a plurality of prediction blocks (partitions) that can be used for predictive coding. In the high efficiency video coding (HEVC) standard, a plurality of block units are classified based on functions by using basic concepts such as a coding unit (CU), a prediction unit (PU), and a transform unit (TU), and are described by using a new tree-based structure. For example, a CU may be split into smaller CUs based on a quadtree, and the smaller CU may be further split, to form a quadtree structure. The CU is a basic unit for splitting and encoding a coding picture. A PU and a TU also have similar tree structures. The PU may correspond to a prediction block, and is a basic unit for predictive coding. The CU is further split into a plurality of PUs in a split mode. The TU may correspond to a transform block, and is a basic unit for transforming a prediction residual. However, in essence, all of the CU, the PU, and the TU are concepts of blocks (or picture blocks).

For example, in HEVC, a CTU is split into a plurality of CUs by using a quadtree structure represented as a coding tree. A decision on whether to code a picture region by using inter-picture (temporal) or intra-picture (spatial) prediction is made at a CU level. Each CU may be further split into one, two, or four PUs based on a PU split type. In one PU, a same prediction process is applied, and related information is transmitted to a decoder on a PU basis. After a residual block is obtained by applying the prediction process based on the PU split type, the CU may be partitioned into transform units (TUs) based on another quadtree structure similar to the coding tree used for the CU. In the recent development of video compression technologies, a quadtree plus binary tree (QTBT) partition frame is used to partition a coding block. In a QTBT block structure, the CU may be square or rectangular.

In this specification, for ease of description and understanding, a to-be-coded picture block in a current coding picture may be referred to as a current block. For example, in encoding, the current block is a block that is being encoded, and in decoding, the current block is a block that is being decoded. A decoded picture block, in a reference picture, used to predict the current block is referred to as a reference block. To be specific, the reference block is a block that provides a reference signal for the current block, and the reference signal represents a pixel value in the picture block. A block that is in the reference picture and that provides a prediction signal for the current block may be referred to as a prediction block. The prediction signal represents a pixel value, a sampling value, or a sampling signal in the prediction block. For example, after a plurality of reference blocks are traversed, an optimal reference block is found. The optimal reference block provides prediction for the current block, and this block is referred to as a prediction block.

In a case of lossless video coding, an original video picture can be reconstructed, that is, a reconstructed video picture has same quality as the original video picture (assuming that no transmission loss or other data loss occurs during storage or transmission). In a case of lossy video coding, further compression is performed through, for example, quantization, to reduce an amount of data required for representing a video picture, and the video picture cannot be completely reconstructed on a decoder side, that is, quality of a reconstructed video picture is lower or poorer than quality of the original video picture.

Several H.261 video coding standards are used for "lossy hybrid video codecs" (that is, spatial and temporal prediction in a sample domain is combined with 2D transform coding for applying quantization in a transform domain). Each picture of a video sequence is usually partitioned into a set of non-overlapping blocks, and coding is usually performed at a block level. In other words, on an encoder side, a video is usually processed, that is, encoded, at a block (video block) level. For example, a prediction block is generated through spatial (intra-picture) prediction and temporal (inter-picture) prediction, the prediction block is subtracted from a current block (a block that is currently being processed or to be processed) to obtain a residual block, and the residual block is transformed in the transform domain and quantized to reduce an amount of data that is to be transmitted (compressed). On a decoder side, an inverse processing part relative to the encoder is applied to the encoded or compressed block to reconstruct the current block for representation. Furthermore, the encoder duplicates a processing loop of the decoder, so that the encoder and the decoder generate identical prediction (for example, intra prediction and inter prediction) and/or reconstruction for processing, that is, coding, a subsequent block.

The following describes a system architecture to which the embodiments of the present disclosure are applied. FIG. 1A is a schematic block diagram of an example of a video encoding and decoding system 10 to which an embodiment of the present disclosure is applied. As shown in FIG. 1A, the video encoding and decoding system 10 may include a source device 12 and a destination device 14. The source device 12 generates encoded video data, and therefore the source device 12 may be referred to as a video encoding apparatus. The destination device 14 may decode the encoded video data generated by the source device 12, and therefore the destination device 14 may be referred to as a video decoding apparatus. In various implementation solutions, the source device 12, the destination device 14, or both the source device 12 and the destination device 14 may include one or more processors and a memory coupled to the one or more processors. The memory may include but is not limited to a RAM, a ROM, an EEPROM, a flash memory, or any other medium that can be used to store desired program code in a form of an instruction or a data structure accessible by a computer, as described in this specification. The source device 12 and the destination device 14 may include various apparatuses, including a desktop computer, a mobile computing apparatus, a notebook (for example, a laptop) computer, a tablet computer, a set-top box, a telephone handset such as a so-called "smart" phone, a television, a camera, a display apparatus, a digital media player, a video game console, a vehicle-mounted computer, a wireless communications device, or the like.

Although FIG. 1A depicts the source device 12 and the destination device 14 as separate devices, a device embodiment may alternatively include both the source device 12 and the destination device 14 or functionalities of both the source device 12 and the destination device 14, that is, the source device 12 or a corresponding functionality and the destination device 14 or a corresponding functionality. In such an embodiment, the source device 12 or the corresponding functionality and the destination device 14 or the corresponding functionality may be implemented by using same hardware and/or software, separate hardware and/or software, or any combination thereof.

A communication connection between the source device 12 and the destination device 14 may be implemented through a link 13, and the destination device 14 may receive the encoded video data from the source device 12 through the link 13. The link 13 may include one or more media or apparatuses capable of moving the encoded video data from the source device 12 to the destination device 14. In an example, the link 13 may include one or more communications media that enable the source device 12 to directly transmit the encoded video data to the destination device 14 in real time. In this example, the source device 12 may modulate the encoded video data according to a communications standard (for example, a wireless communications protocol), and may transmit modulated video data to the destination device 14. The one or more communications media may include a wireless communications medium and/or a wired communications medium, for example, a radio frequency (RF) spectrum or one or more physical transmission cables. The one or more communications media may constitute a part of a packet-based network, and the packet-based network is, for example, a local area network, a wide area network, or a global network (for example, the internet). The one or more communications media may include a router, a switch, a base station, or another device that facilitates communication from the source device 12 to the destination device 14.

The source device 12 includes an encoder 20. Optionally, the source device 12 may further include a picture source 16, a picture preprocessor 18, and a communications interface 22. In a specific implementation form, the encoder 20, the picture source 16, the picture preprocessor 18, and the communications interface 22 may be hardware components in the source device 12, or may be software programs in the source device 12. Descriptions are separately provided as follows.

The picture source 16 may include or be any type of picture capturing device configured to, for example, capture a real-world picture; and/or any type of device for generating a picture or comment (for screen content coding, some text on a screen is also considered as a part of a to-be-coded picture or image), for example, a computer graphics processing unit configured to generate a computer animation picture; or any type of device configured to obtain and/or provide a real-world picture or a computer animation picture (for example, screen content or a virtual reality (VR) picture), and/or any combination thereof (for example, an augmented reality (AR) picture). The picture source 16 may be a camera configured to capture a picture or a memory configured to store a picture. The picture source 16 may further include any type of (internal or external) interface through which a previously captured or generated picture is stored and/or a picture is obtained or received. When the picture source 16 is a camera, the picture source 16 may be, for example, a local camera or a camera integrated into the source device. When the picture source 16 is a memory, the picture source 16 may be a local memory or, for example, a memory integrated into the source device. When the picture source 16 includes an interface, the interface may be, for example, an external interface for receiving a picture from an external video source. The external video source is, for example, an external picture capturing device such as a camera, an external memory, or an external picture generation device. The external picture generation device is, for example, an external computer graphics processing unit, a computer, or a server. The interface may be any type of interface, for example, a wired or wireless interface or an optical interface, according to any proprietary or standardized interface protocol.

A picture may be considered as a two-dimensional array or matrix of pixels (picture elements). The pixel in the array may also be referred to as a sample. A quantity of samples in horizontal and vertical directions (or axes) of the array or the picture defines the size and/or resolution of the picture. For representation of a color, three color components are usually used. For example, the picture may be represented as or include three sample arrays. For example, in an RBG format or color space, the picture includes corresponding red, green, and blue sample arrays. However, in video coding, each pixel is usually represented in a luma/chroma format or color space. For example, a picture in a YUV format includes a luma component indicated by Y (or sometimes indicated by L) and two chroma components indicated by U and V. The luma component Y represents brightness or gray level intensity (for example, both are the same in a gray-scale picture), and the two chroma components U and V represent chroma or color information components. Correspondingly, the picture in the YUV format includes a luma sample array of luma sample values (Y) and two chroma sample arrays of chroma values (U and V). A picture in an RGB format may be transformed or converted into a YUV format and vice versa. This process is also referred to as color conversion or transformation. If a picture is monochrome, the picture may include only a luma sample array. In this embodiment of the present disclosure, a picture transmitted by the picture source 16 to the picture preprocessor may also be referred to as raw picture data 17.

The picture preprocessor 18 is configured to receive the raw picture data 17 and perform preprocessing on the raw picture data 17 to obtain a preprocessed picture 19 or preprocessed picture data 19. For example, the preprocessing performed by the picture preprocessor 18 may include trimming, color format conversion (for example, from an RGB format to a YUV format), color correction, or denoising.

The encoder 20 (or referred to as a video encoder 20) is configured to receive the preprocessed picture data 19, and process the preprocessed picture data 19 in a related prediction mode (such as a prediction mode in the embodiments of this specification), to provide encoded picture data 21 (structural details of the encoder 20 are further described below based on FIG. 2, FIG. 4, or FIG. 5). In some embodiments, the encoder 20 may be configured to perform various embodiments described below, to implement encoder-side application of a non-separable transform method described in the present disclosure.

The communications interface 22 may be configured to receive the encoded picture data 21, and transmit the encoded picture data 21 to the destination device 14 or any other device (for example, a memory) through the link 13 for storage or direct reconstruction. The any other device may be any device used for decoding or storage. The communications interface 22 may be, for example, configured to encapsulate the encoded picture data 21 in an appropriate format, for example, into a data packet, for transmission over the link 13.

The destination device 14 includes a decoder 30. Optionally, the destination device 14 may further include a communications interface 28, a picture post-processor 32, and a display device 34. Descriptions are separately provided as follows.

The communications interface 28 may be configured to receive the encoded picture data 21 from the source device 12 or any other source. The any other source is, for example, a storage device. The storage device is, for example, an encoded picture data storage device. The communications interface 28 may be configured to transmit or receive the encoded picture data 21 through the link 13 between the source device 12 and the destination device 14 or through any type of network. The link 13 is, for example, a direct wired or wireless connection. The any type of network is, for example, a wired or wireless network or any combination thereof, or any type of private or public network or any combination thereof. The communications interface 28 may be, for example, configured to decapsulate the data packet transmitted through the communications interface 22, to obtain the encoded picture data 21.

Both the communications interface 28 and the communications interface 22 may be configured as unidirectional communications interfaces or bidirectional communications interfaces, and may be configured to, for example, send and receive messages to establish a connection, and acknowledge and exchange any other information related to a communication link and/or data transmission such as encoded picture data transmission.

The decoder 30 (or referred to as a video decoder 30) is configured to receive the encoded picture data 21 and provide decoded picture data 31 or a decoded picture 31 (structural details of the decoder 30 are further described below based on FIG. 3, FIG. 4, or FIG. 5). In some embodiments, the decoder 30 may be configured to perform various embodiments described below, to implement decoder-side application of a non-separable transform method described in the present disclosure.

The picture post-processor 32 is configured to perform post-processing on the decoded picture data 31 (also referred to as reconstructed picture data) to obtain post-processed picture data 33. The post-processing performed by the picture post-processor 32 may include color format conversion (for example, from a YUV format to an RGB format), color correction, trimming, re-sampling, or any other processing. The picture post-processor 32 may be further configured to transmit the post-processed picture data 33 to the display device 34.

The display device 34 is configured to receive the post-processed picture data 33 to display a picture, for example, to a user or a viewer. The display device 34 may be or may include any type of display for presenting a reconstructed picture, for example, an integrated or external display or monitor. For example, the display may include a liquid crystal display (LCD), an organic light emitting diode (OLED) display, a plasma display, a projector, a micro LED display, a liquid crystal on silicon (LCoS), a digital light processor (DLP), or any type of other displays.

Although FIG. 1A depicts the source device 12 and the destination device 14 as separate devices, a device embodiment may alternatively include both the source device 12 and the destination device 14 or functionalities of both the source device 12 and the destination device 14, that is, the source device 12 or a corresponding functionality and the destination device 14 or a corresponding functionality. In such an embodiment, the source device 12 or the corresponding functionality and the destination device 14 or the corresponding functionality may be implemented by using same hardware and/or software, separate hardware and/or software, or any combination thereof.

Based on the descriptions, a person skilled in the art can definitely learn that existence and (exact) division of functionalities of different units or functionalities of the source device 12 and/or the destination device 14 shown in FIG. 1A may vary depending on an actual device and application. The source device 12 and the destination device 14 may include any one of a wide range of devices, including any type of handheld or stationary device, for example, a notebook or laptop computer, a mobile phone, a smartphone, a tablet or tablet computer, a video camera, a desktop computer, a set-top box, a television, a camera, a vehicle-mounted device, a display device, a digital media player, a video game console, a video streaming device (such as a content service server or a content delivery server), a broadcast receiver device, or a broadcast transmitter device, and may use or not use any type of operating system.

The encoder 20 and the decoder 30 each may be implemented as any one of various appropriate circuits, for example, one or more microprocessors, digital signal processors (DSPs), application-specific integrated circuits (ASICs), field programmable gate arrays (FPGAs), discrete logic, hardware, or any combination thereof. If the technologies are implemented partially by using software, a device may store software instructions in an appropriate and non-transitory computer-readable storage medium and may execute instructions by using hardware such as one or more processors, to perform the technologies of this disclosure. Any one of the foregoing content (including hardware, software, a combination of hardware and software, and the like) may be considered as one or more processors.

In some cases, the video encoding and decoding system 10 shown in FIG. 1A is merely an example and the technologies of this application may be applied to video coding settings (for example, video encoding or video decoding) that do not necessarily include any data communication between an encoding device and a decoding device. In other examples, data may be retrieved from a local memory, streamed over a network, or the like. A video encoding device may encode data and store encoded data into the memory, and/or a video decoding device may retrieve data from the memory and decode the data. In some examples, encoding and decoding are performed by devices that do not communicate with each other, but simply store encoded data to the memory and/or retrieve data from the memory and decode the data.

Figure 1B:
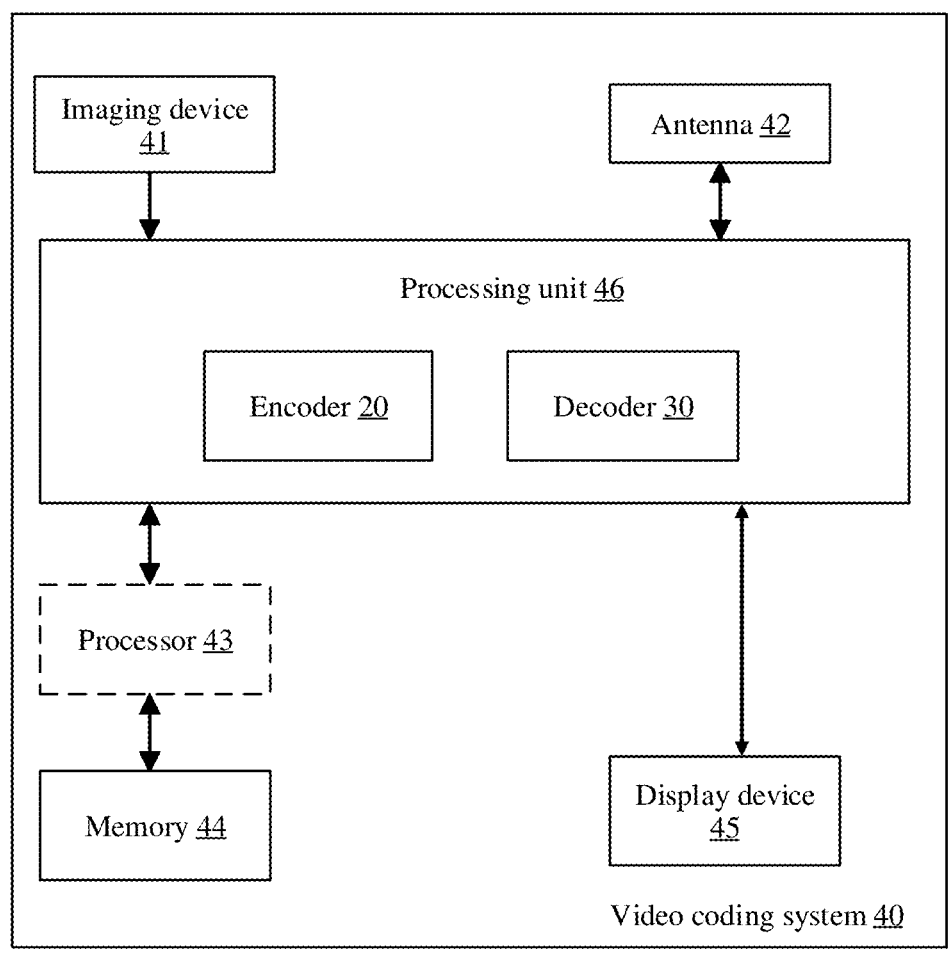
FIG. 1B is a block diagram of an example of a video coding system 40 for implementing an embodiment of the present disclosure.
Figure 2:
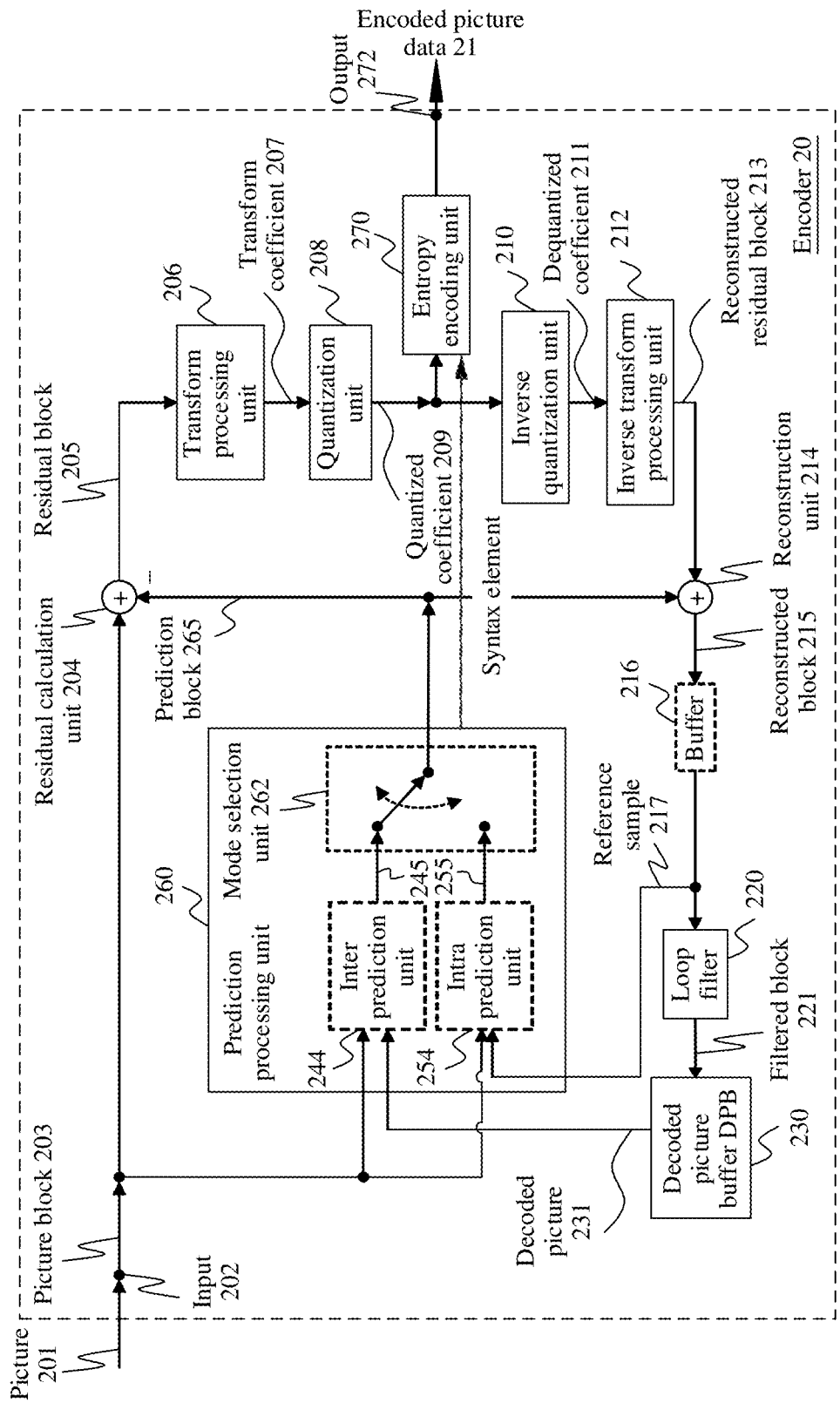
FIG. 2 is a block diagram of an example structure of an encoder 20 for implementing an embodiment of the present disclosure.
Figure 3:
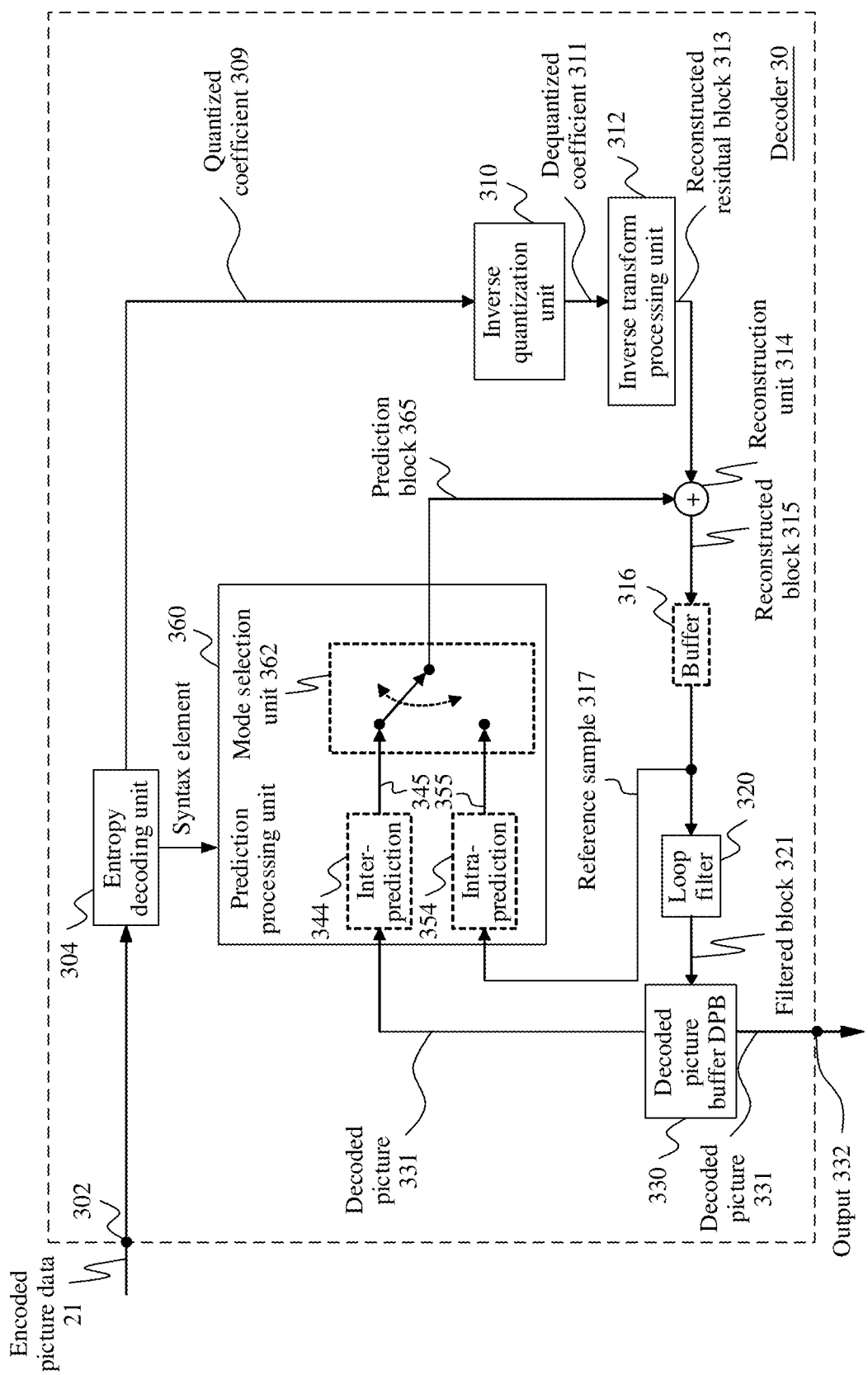
FIG. 3 is a block diagram of an example structure of a decoder 30 for implementing an embodiment of the present disclosure.

FIG. 1B is an illustrative diagram of an example of a video coding system 40 including an encoder 20 in FIG. 2 and/or a decoder 30 in FIG. 3 according to an example embodiment. The video coding system 40 can implement a combination of various technologies in the embodiments of the present disclosure. In an illustrated implementation, the video coding system 40 may include an imaging device 41, the encoder 20, the decoder 30 (and/or a video encoder/decoder implemented by a logic circuit 47 of a processing unit 46), an antenna 42, one or more processors 43, one or more memories 44, and/or a display device 45.

As shown in FIG. 1B, the imaging device 41, the antenna 42, the processing unit 46, the logic circuit 47, the encoder 20, the decoder 30, the processor 43, the memory 44, and/or the display device 45 can communicate with each other. As described, although the video coding system 40 is illustrated with the encoder 20 and the decoder 30, the video coding system 40 may include only the encoder 20 or only the decoder 30 in different examples.

In some examples, the antenna 42 may be configured to transmit or receive an encoded bitstream of video data. In addition, in some examples, the display device 45 may be configured to present the video data. In some examples, the logic circuit 47 may be implemented by the processing unit 46. The processing unit 46 may include application-specific integrated circuit (ASIC) logic, a graphics processing unit, a general-purpose processor, or the like. The video coding system 40 may alternatively include an optional processor 43. The optional processor 43 may similarly include application-specific integrated circuit (ASIC) logic, a graphics processing unit, a general-purpose processor, or the like. In some examples, the logic circuit 47 may be implemented by using hardware, for example, dedicated hardware for video coding. The processor 43 may be implemented by using general-purpose software, an operating system, or the like. In addition, the memory 44 may be any type of memory, for example, a volatile memory (for example, a static random access memory (SRAM), a dynamic random access memory (DRAM)), or a non-volatile memory (for example, a flash memory). In a non-limitative example, the memory 44 may be implemented by a cache memory. In some examples, the logic circuit 47 may access the memory 44 (for example, for implementing a picture buffer). In other examples, the logic circuit 47 and/or the processing unit 46 may include a memory (for example, a cache) for implementing a picture buffer or the like.

In some examples, the encoder 20 implemented by the logic circuit may include a picture buffer (which is implemented by, for example, the processing unit 46 or the memory 44) and a graphics processing unit (which is implemented by, for example, the processing unit 46). The graphics processing unit may be communicatively coupled to the picture buffer. The graphics processing unit may include the encoder 20 implemented by the logic circuit 47, to implement various modules that are described with reference to FIG. 2 and/or any other encoder system or subsystem described in this specification. The logic circuit may be configured to perform various operations described in this specification.

In some examples, the decoder 30 may be implemented by the logic circuit 47 in a similar manner, to implement various modules that are described with reference to the decoder 30 in FIG. 3 and/or any other decoder system or subsystem described in this specification. In some examples, the decoder 30 implemented by the logic circuit may include a picture buffer (which is implemented by the processing unit 46 or the memory 44) and a graphics processing unit (which is implemented by, for example, the processing unit 46). The graphics processing unit may be communicatively coupled to the picture buffer. The graphics processing unit may include the decoder 30 implemented by the logic circuit 47, to implement various modules that are described with reference to FIG. 3 and/or any other decoder system or subsystem described in this specification.

In some examples, the antenna 42 may be configured to receive an encoded bitstream of video data. As described, the encoded bitstream may include data, an indicator, an index value, mode selection data, or the like that is related to video frame coding and that is described in this specification, for example, data related to coding partitioning (for example, a transform coefficient or a quantized transform coefficient, an optional indicator (as described), and/or data defining the coding partitioning). The video coding system 40 may further include the decoder 30 that is coupled to the antenna 42 and that is configured to decode the encoded bitstream. The display device 45 is configured to present a video frame.

It should be understood that, in this embodiment of the present disclosure, for the example described with reference to the encoder 20, the decoder 30 may be configured to perform an inverse process. With regard to a signaling syntax element, the decoder 30 may be configured to receive and parse the syntax element and correspondingly decode related video data. In some examples, the encoder 20 may entropy-encode the syntax element into an encoded video bitstream. In such examples, the decoder 30 may parse the syntax element and correspondingly decode the related video data.

It should be noted that a non-separable transform method described in the embodiments of the present disclosure is applicable to both the encoder 20 and the decoder 30. The encoder 20 and the decoder 30 in the embodiments of the present disclosure may be, for example, an encoder/a decoder corresponding to a video standard protocol such as H.263, H.264, HEVV, MPEG-2, MPEG-4, VP8, or VP9, or a next-generation video standard protocol (for example, H.266).

FIG. 2 is a schematic/conceptual block diagram of an example of an encoder 20 for implementing an embodiment of the present disclosure. In the example in FIG. 2, the encoder 20 includes a residual calculation unit 204, a transform processing unit 206, a quantization unit 208, an inverse quantization unit 210, an inverse transform processing unit 212, a reconstruction unit 214, a buffer 216, a loop filter unit 220, a decoded picture buffer (DPB) 230, a prediction processing unit 260, and an entropy encoding unit 270. The prediction processing unit 260 may include an inter prediction unit 244, an intra prediction unit 254, and a mode selection unit 262. The inter prediction unit 244 may include a motion estimation unit and a motion compensation unit (which are not shown in the figure). The encoder 20 shown in FIG. 2 may also be referred to as a hybrid video encoder or a video encoder based on a hybrid video codec.

For example, the residual calculation unit 204, the transform processing unit 206, the quantization unit 208, the prediction processing unit 260, and the entropy encoding unit 270 form a forward signal path of the encoder 20, whereas, for example, the inverse quantization unit 210, the inverse transform processing unit 212, the reconstruction unit 214, the buffer 216, the loop filter 220, the decoded picture buffer (DPB) 230, and the prediction processing unit 260 form a backward signal path of the encoder. The backward signal path of the encoder corresponds to a signal path of a decoder (refer to the decoder 30 in FIG. 3).

The encoder 20 receives, for example, through an input 202, a picture 201 or a picture block 203 of the picture 201, for example, a picture in a sequence of pictures forming a video or a video sequence. The picture block 203 may also be referred to as a current picture block or a to-be-coded picture block, and the picture 201 may be referred to as a current picture or a to-be-coded picture (particularly in video coding, for distinguishing the current picture from other pictures, for example, previously encoded and/or decoded pictures in a same video sequence, that is, the video sequence that also includes the current picture).

In an embodiment, the encoder 20 may include a partitioning unit (not depicted in FIG. 2), configured to partition the picture 201 into a plurality of blocks such as picture blocks 203. The picture 201 is usually partitioned into a plurality of non-overlapping blocks. The partitioning unit may be configured to: use a same block size for all pictures in the video sequence and a corresponding grid defining the block size, or change a block size between pictures or subsets or groups of pictures, and partition each picture into corresponding blocks.

In an example, the prediction processing unit 260 of the encoder 20 may be configured to perform any combination of the partitioning technologies described above.

Like the picture 201, the picture block 203 is also or may be considered as a two-dimensional array or matrix of samples with sample values, although the size of the picture block 203 is smaller than the size of the picture 201. In other words, the picture block 203 may include, for example, one sample array (for example, a luma array in a case of a monochrome picture 201), three sample arrays (for example, one luma array and two chroma arrays in a case of a color picture), or any other quantity and/or type of arrays depending on an applied color format. Quantities of samples in horizontal and vertical directions (or axes) of the picture block 203 define the size of the picture block 203.

The encoder 20 shown in FIG. 2 is configured to encode the picture 201 block by block, for example, perform encoding and prediction on each picture block 203.

The residual calculation unit 204 is configured to calculate a residual block 205 based on the picture block 203 and a prediction block 265 (other details about the prediction block 265 are provided below), for example, by subtracting sample values of the prediction block 265 from sample values of the picture block 203 sample by sample (pixel by pixel), to obtain the residual block 205 in a sample domain.

The transform processing unit 206 is configured to apply a transform, for example, a discrete cosine transform (DCT) or a discrete sine transform (DST), to sample values of the residual block 205 to obtain transform coefficients 207 in a transform domain. The transform coefficient 207 may also be referred to as a transform residual coefficient and represents the residual block 205 in the transform domain.

The transform processing unit 206 may be configured to apply integer approximations of DCT/DST, such as transforms specified in HEVC/H.265. In comparison with an orthogonal DCT transform, such an integer approximation is usually scaled by a factor. To preserve a norm of a residual block that is processed by using forward and inverse transforms, applying an additional scale factor is a part of a transform process. The scale factor is usually chosen based on some constraints. For example, the scale factor is a power of two for a shift operation, a bit depth of the transform coefficient, or a tradeoff between accuracy and implementation costs. For example, a specific scale factor is specified for the inverse transform by, for example, the inverse transform processing unit 212 at the side of the decoder 30 (and a corresponding inverse transform by, for example, the inverse transform processing unit 212 at the side of the encoder 20), and correspondingly, a corresponding scale factor may be specified for the forward transform by the transform processing unit 206 at the side of the encoder 20.

The quantization unit 208 is configured to quantize the transform coefficients 207 to obtain quantized transform coefficients 209, for example, by applying scalar quantization or vector quantization. The quantized transform coefficient 209 may also be referred to as a quantized residual coefficient 209. A quantization process may reduce a bit depth related to a part or all of the transform coefficients 207. For example, an n-bit transform coefficient may be rounded down to an m-bit transform coefficient during quantization, where n is greater than m. A quantization degree may be modified by adjusting a quantization parameter (QP). For example, for scalar quantization, different scales may be applied to achieve finer or coarser quantization. A smaller quantization step corresponds to finer quantization, and a larger quantization step corresponds to coarser quantization. An applicable quantization step may be indicated by the quantization parameter (QP). For example, the quantization parameter may be an index to a predefined set of applicable quantization steps. For example, a smaller quantization parameter may correspond to finer quantization (a smaller quantization step), and a larger quantization parameter may correspond to coarser quantization (a larger quantization step) or vice versa. The quantization may include division by a quantization step and corresponding quantization or inverse quantization, for example, performed by the inverse quantization unit 210, or may include multiplication by a quantization step. In embodiments according to some standards such as HEVC, a quantization parameter may be used to determine the quantization step. Generally, the quantization step may be calculated based on a quantization parameter by using a fixed point approximation of an equation including division. Additional scale factors may be introduced for quantization and dequantization to restore the norm of the residual block, where the norm of the residual block may be modified because of a scale used in the fixed point approximation of the equation for the quantization step and the quantization parameter. In an example implementation, scales of the inverse transform and the dequantization may be combined. Alternatively, a customized quantization table may be used and signaled from the encoder to the decoder, for example, in a bitstream. The quantization is a lossy operation, where a loss increases with an increasing quantization step.

The inverse quantization unit 210 is configured to apply inverse quantization of the quantization unit 208 to a quantization coefficient to obtain a dequantized coefficient 211, for example, apply, based on or by using a same quantization step as the quantization unit 208, the inverse of a quantization scheme applied by the quantization unit 208. The dequantized coefficient 211 may also be referred to as a dequantized residual coefficient 211 and correspond to the transform coefficient 207, although the dequantized coefficient 211 is usually different from the transform coefficient due to a loss caused by quantization.

The inverse transform processing unit 212 is configured to apply an inverse transform of the transform applied by the transform processing unit 206, for example, an inverse discrete cosine transform (DCT) or an inverse discrete sine transform (DST), to obtain an inverse transform block 213 in the sample domain. The inverse transform block 213 may also be referred to as an inverse transform dequantized block 213 or an inverse transform residual block 213.

The reconstruction unit 214 (for example, a summator 214) is configured to add the inverse transform block 213 (that is, a reconstructed residual block 213) to the prediction block 265, for example, by adding a sample value of the reconstructed residual block 213 and a sample value of the prediction block 265, to obtain a reconstructed block 215 in the sample domain.

Optionally, a buffer unit 216 ("buffer" 216 for short) of, for example, a line buffer 216, is configured to buffer or store the reconstructed block 215 and a corresponding sample value, for example, for intra prediction. In other embodiments, the encoder may be configured to use an unfiltered reconstructed block and/or a corresponding sample value that are/is stored in the buffer unit 216, for any type of estimation and/or prediction, for example, intra prediction.

For example, in an embodiment, the encoder 20 may be configured so that the buffer unit 216 is configured to store the reconstructed block 215 not only used for intra prediction 254 but also used for the loop filter unit 220 (not shown in FIG. 2), and/or so that, for example, the buffer unit 216 and the decoded picture buffer 230 form one buffer. In other embodiments, a filtered block 221 and/or a block or a sample from the decoded picture buffer 230 (the block or sample is not shown in FIG. 2) are/is used as an input or a basis for the intra prediction unit 254.

The loop filter unit 220 ("loop filter" 220 for short) is configured to filter the reconstructed block 215 to obtain the filtered block 221, to smooth pixel transition or improve video quality. The loop filter unit 220 is intended to represent one or more loop filters, for example, a deblocking filter, a sample-adaptive offset (SAO) filter, or another filter such as a bilateral filter, an adaptive loop filter (ALF), a sharpening or smoothing filter, or a collaborative filter. Although the loop filter unit 220 is shown as an in-loop filter in FIG. 2, in another configuration, the loop filter unit 220 may be implemented as a post-loop filter. The filtered block 221 may also be referred to as a filtered reconstructed block 221. The decoded picture buffer 230 may store a reconstructed encoded block after the loop filter unit 220 performs a filtering operation on the reconstructed encoded block.

In an embodiment, the encoder 20 (correspondingly, the loop filter unit 220) may be configured to output a loop filter parameter (for example, sample adaptive offset information), for example, directly or after entropy encoding performed by the entropy encoding unit 270 or any other entropy encoding unit, so that, for example, the decoder 30 can receive and apply the same loop filter parameter for decoding.

The decoded picture buffer (DPB) 230 may be a reference picture memory that stores reference picture data for use in video data encoding by the encoder 20. The DPB 230 may be formed by any one of a variety of memory devices such as a dynamic random access memory (DRAM) (including a synchronous DRAM (synchronous DRAM, SDRAM), a magnetoresistive RAM (MRAM), and a resistive RAM (RRAM), or another type of memory device. The DPB 230 and the buffer 216 may be provided by a same memory device or separate memory devices. In an example, the decoded picture buffer (DPB) 230 is configured to store the filtered block 221. The decoded picture buffer 230 may be further configured to store another previously filtered block, for example, a previously reconstructed and filtered block 221, of a same current picture or of a different picture, for example, a previously reconstructed picture, and may provide a complete previously reconstructed, that is, decoded picture (and a corresponding reference block and sample) and/or a partially reconstructed current picture (and a corresponding reference block and sample), for example, for inter prediction. In an example, if the reconstructed block 215 is reconstructed without in-loop filtering, the decoded picture buffer (DPB) 230 is configured to store the reconstructed block 215.

The prediction processing unit 260, also referred to as a block prediction processing unit 260, is configured to receive or obtain the picture block 203 (a current picture block 203 of the current picture 201) and reconstructed picture data, for example, reference samples of the same (current) picture from the buffer 216 and/or reference picture data 231 of one or more previously decoded pictures from the decoded picture buffer 230; and is configured to process such data for prediction, that is, to provide the prediction block 265 that may be an inter prediction block 245 or an intra prediction block 255.

The mode selection unit 262 may be configured to select a prediction mode (for example, an intra or inter prediction mode) and/or a corresponding prediction block 245 or 255 to be used as the prediction block 265, to calculate the residual block 205 and reconstruct the reconstructed block 215.

In an embodiment, the mode selection unit 262 may be configured to select the prediction mode (for example, from prediction modes supported by the prediction processing unit 260), where the prediction mode provides a best match or a minimum residual (the minimum residual means better compression for transmission or storage), or provides a minimum signaling overhead (the minimum signaling overhead means better compression for transmission or storage), or considers or balances both. The mode selection unit 262 may be configured to determine the prediction mode based on rate-distortion optimization (RDO), to be specific, select a prediction mode that provides minimum rate-distortion optimization or select a prediction mode for which related rate distortion at least satisfies a prediction mode selection criterion.

The following describes in detail prediction processing performed (for example, by the prediction processing unit 260) and mode selection performed (for example, by the mode selection unit 262) in an example of the encoder 20.

As described above, the encoder 20 is configured to determine or select an optimal or optimum prediction mode from a set of (predetermined) prediction modes. The set of prediction modes may include, for example, an intra prediction mode and/or an inter prediction mode.

A set of intra prediction modes may include 35 different intra prediction modes, for example, non-directional modes such as a DC (or average) mode and a planar mode, or directional modes such as those defined in H.265, or may include 67 different intra prediction modes, for example, non-directional modes such as a DC (or average) mode and a planar mode, or directional modes such as those defined in H.266 under development.

In a possible implementation, a set of inter prediction modes depends on available reference pictures (namely, for example, at least a part of decoded pictures stored in the DBP 230, as described above) and other inter prediction parameters, for example, depends on whether an entire reference picture or only a part of the reference picture, for example, a search window region around a region of the current block, is used for searching for an optimal matching reference block, and/or for example, depends on whether pixel interpolation such as half-pixel and/or quarter-pixel interpolation is applied. The set of inter prediction modes may include, for example, an advanced motion vector prediction (AMVP) mode and a merge mode. During specific implementation, the set of inter prediction modes may include an AMVP mode based on a control point and a merge mode based on a control point that are improved in the embodiments of the present disclosure. In an example, the intra prediction unit 254 may be configured to perform any combination of inter prediction technologies described below.

In addition to the foregoing prediction modes, a skip mode and/or a direct mode may also be applied in the embodiments of the present disclosure.

The prediction processing unit 260 may be further configured to partition the picture block 203 into smaller block partitions or subblocks, for example, by iteratively using quadtree (QT) partitioning, binary tree (BT) partitioning, triple tree (TT) partitioning, or any combination thereof, and perform, for example, prediction on each of the block partitions or subblocks. Mode selection includes selection of a tree structure of the partitioned picture block 203 and selection of a prediction mode applied for each of the block partitions or subblocks.

The inter prediction unit 244 may include a motion estimation (ME) unit (not shown in FIG. 2) and a motion compensation (MC) unit (not shown in FIG. 2). The motion estimation unit is configured to receive or obtain the picture block 203 (the current picture block 203 of the current picture 201) and a decoded picture 231, or at least one or more previously reconstructed blocks, for example, one or more reconstructed blocks of other/different previously decoded pictures 231, for motion estimation. For example, a video sequence may include the current picture and a previously decoded picture 31, or in other words, the current picture and the previously decoded picture 31 may be a part of or form a sequence of pictures forming the video sequence.

For example, the encoder 20 may be configured to select a reference block from a plurality of reference blocks of a same picture or different pictures in a plurality of other pictures and provide, for the motion estimation unit (not shown in FIG. 2), a reference picture and/or provide an offset (a spatial offset) between a position (coordinates X and Y) of the reference block and a position of the current block as an inter prediction parameter. This offset is also referred to as a motion vector (MV).

The motion compensation unit is configured to obtain the inter prediction parameter, and perform inter prediction based on or by using the inter prediction parameter, to obtain the inter prediction block 245. Motion compensation performed by the motion compensation unit (not shown in FIG. 2) may include fetching or generating a prediction block based on a motion/block vector determined through motion estimation (possibly by performing interpolation in sub-pixel precision). Interpolation filtering may generate additional pixel samples from known pixel samples. This potentially increases a quantity of candidate prediction blocks that may be used to code a picture block. Upon receiving a motion vector for a PU of the current picture block, the motion compensation unit may locate a prediction block to which the motion vector points in one reference picture list. The motion compensation unit may further generate syntax elements associated with a block and a video slice, for decoding a picture block of the video slice by the decoder 30.

Specifically, the inter prediction unit 244 may transmit the syntax elements to the entropy encoding unit 270, where the syntax elements include the inter prediction parameter (such as indication information of selection of an inter prediction mode used for prediction of the current block after traversal of a plurality of inter prediction modes). In a possible application scenario, if there is only one inter prediction mode, the inter prediction parameter may alternatively not be carried in the syntax element. In this case, the decoder 30 may directly perform decoding in a default prediction mode. It may be understood that the inter prediction unit 244 may be configured to perform any combination of inter prediction technologies.

The intra prediction unit 254 is configured to obtain, for example, receive, a picture block 203 (a current picture block) and one or more previously reconstructed blocks, for example, reconstructed neighboring blocks, of a same picture for intra estimation. For example, the encoder 20 may be configured to select an intra prediction mode from a plurality of (predetermined) intra prediction modes.

In an embodiment, the encoder 20 may be configured to select the intra prediction mode according to an optimization criterion, for example, based on a minimum residual (for example, an intra prediction mode providing the prediction block 255 that is most similar to the current picture block 203) or minimum rate distortion.

The intra prediction unit 254 is further configured to determine the intra prediction block 255 based on, for example, an intra prediction parameter in the selected intra prediction mode. In any case, after selecting an intra-prediction mode for a block, the intra prediction unit 254 is further configured to provide an intra prediction parameter, that is, information indicating the selected intra-prediction mode for the block, to the entropy encoding unit 270. In an example, the intra prediction unit 254 may be configured to perform any combination of intra prediction technologies.

Specifically, the intra prediction unit 254 may transmit syntax elements to the entropy encoding unit 270, where the syntax elements include the intra prediction parameter (such as indication information of selection of an intra prediction mode used for prediction of the current block after traversal of a plurality of intra prediction modes). In a possible application scenario, if there is only one intra prediction mode, the intra prediction parameter may alternatively not be carried in the syntax element. In this case, the decoder 30 may directly perform decoding in a default prediction mode.

The entropy encoding unit 270 is configured to apply (or skip applying) an entropy encoding algorithm or scheme (for example, a variable length coding (VLC) scheme, a context adaptive VLC (CAVLC) scheme, an arithmetic coding scheme, context adaptive binary arithmetic coding (CABAC), syntax-based context-adaptive binary arithmetic coding (SBAC), probability interval partitioning entropy (PIPE) coding, or another entropy encoding methodology or technique) on one or all of the following: the quantized coefficient 209, the inter prediction parameter, the intra prediction parameter, and/or the loop filter parameter, to obtain the encoded picture data 21 that may be output through an output 272, for example, in a form of an encoded bitstream 21. The encoded bitstream may be transmitted to the video decoder 30, or archived for later transmission or retrieval by the video decoder 30. The entropy encoding unit 270 may be further configured to entropy encode another syntax element for a current video slice that is being encoded.

Another structural variant of the video encoder 20 may be configured to encode a video bitstream. For example, a non-transform based encoder 20 may directly quantize a residual signal without the transform processing unit 206 for some blocks or frames. In another implementation, the encoder 20 may have the quantization unit 208 and the inverse quantization unit 210 that are combined into a single unit.

Specifically, in this embodiment of the present disclosure, the encoder 20 may be configured to implement a non-separable transform method described in the following embodiments.

It should be understood that another structural variant of the video encoder 20 may be configured to encode a video bitstream. For example, for some picture blocks or picture frames, the video encoder 20 may directly quantize a residual signal, processing by the transform processing unit 206 is not required, and correspondingly, processing by the inverse transform processing unit 212 is not required either. Alternatively, for some picture blocks or picture frames, the video encoder 20 does not generate residual data, and correspondingly, processing by the transform processing unit 206, the quantization unit 208, the inverse quantization unit 210, and the inverse transform processing unit 212 is not required. Alternatively, the video encoder 20 may directly store a reconstructed picture block as a reference block, and processing by the filter 220 is not required. Alternatively, the quantization unit 208 and the inverse quantization unit 210 in the video encoder 20 may be combined. The loop filter 220 is optional, and in a case of lossless compression coding, the transform processing unit 206, the quantization unit 208, the inverse quantization unit 210, and the inverse transform processing unit 212 are optional. It should be understood that, according to different application scenarios, the inter prediction unit 244 and the intra prediction unit 254 may be selectively enabled.

FIG. 3 is a schematic/conceptual block diagram of an example of a decoder 30 for implementing an embodiment of the present disclosure. The video decoder 30 is configured to receive encoded picture data (for example, an encoded bitstream) 21 obtained through encoding by, for example, an encoder 20, to obtain a decoded picture 231. In a decoding process, the video decoder 30 receives video data from the video encoder 20, for example, an encoded video bitstream that represents a picture block of an encoded video slice, and an associated syntax element.

In the example in FIG. 3, the decoder 30 includes an entropy decoding unit 304, an inverse quantization unit 310, an inverse transform processing unit 312, a reconstruction unit 314 (for example, a summator 314), a buffer 316, a loop filter 320, a decoded picture buffer 330, and a prediction processing unit 360. The prediction processing unit 360 may include an inter prediction unit 344, an intra prediction unit 354, and a mode selection unit 362. In some examples, the video decoder 30 may perform a decoding pass generally reciprocal to the encoding pass described with reference to the video encoder 20 in FIG. 2.

The entropy decoding unit 304 is configured to perform entropy decoding on the encoded picture data 21 to obtain, for example, a quantized coefficient 309 and/or a decoded coding parameter (not shown in FIG. 3), for example, any one or all of an inter prediction parameter, an intra prediction parameter, a loop filter parameter, and/or another syntax element (that are decoded). The entropy decoding unit 304 is further configured to forward the inter prediction parameter, the intra prediction parameter, and/or the another syntax element to the prediction processing unit 360. The video decoder 30 may receive syntax elements at a video slice level and/or a video block level.

The inverse quantization unit 310 may have a same function as the inverse quantization unit 110. The inverse transform processing unit 312 may have a same function as the inverse transform processing unit 212. The reconstruction unit 314 may have a same function as the reconstruction unit 214. The buffer 316 may have a same function as the buffer 216. The loop filter 320 may have a same function as the loop filter 220. The decoded picture buffer 330 may have a same function as the decoded picture buffer 230.

The prediction processing unit 360 may include the inter prediction unit 344 and the intra prediction unit 354. A function of the inter prediction unit 344 may be similar to a function of the inter prediction unit 244, and a function of the intra prediction unit 354 may be similar to a function of the intra prediction unit 254. The prediction processing unit 360 is usually configured to perform block prediction and/or obtain a prediction block 365 from the encoded data 21, and receive or obtain (explicitly or implicitly) a prediction-related parameter and/or information about a selected prediction mode, for example, from the entropy decoding unit 304.

When a video slice is encoded as an intra-encoded (I) slice, the intra prediction unit 354 of the prediction processing unit 360 is configured to generate the prediction block 365 for a picture block of the current video slice based on a signaled intra prediction mode and data that is from a previously decoded block of a current frame or picture. When a video frame is encoded as an inter-encoded (B or P) slice, the inter prediction unit 344 (for example, a motion compensation unit) of the prediction processing unit 360 is configured to generate the prediction block 365 for a video block of the current video slice based on a motion vector and another syntax element that is received from the entropy decoding unit 304. For inter prediction, the prediction block may be generated from one reference picture in one reference picture list. The video decoder 30 may construct reference frame lists: a list 0 and a list 1, by using a default construction technology based on reference pictures stored in the DPB 330.

The prediction processing unit 360 is configured to determine prediction information for the video block of the current video slice by parsing the motion vector and the another syntax element, and use the prediction information to generate a prediction block for the current video block that is being decoded. In an example of the present disclosure, the prediction processing unit 360 determines, by using some received syntax elements, a prediction mode (for example, intra or inter prediction) for encoding the video block of the video slice, an inter prediction slice type (for example, a B slice, a P slice, or a GPB slice), construction information of one or more of the reference picture lists for the slice, a motion vector for each inter encoded video block of the slice, an inter prediction status of each inter encoded video block of the slice, and other information, to decode the video block of the current video slice. In another example of this disclosure, syntax elements received by the video decoder 30 from a bitstream include syntax elements in one or more of an adaptive parameter set (APS), a sequence parameter set (SPS), a picture parameter set (PPS), or a slice header.

The inverse quantization unit 310 may be configured to perform inverse quantization (namely, dequantization) on a quantized transform coefficient that is provided in the bitstream and that is decoded by the entropy decoding unit 304. An inverse quantization process may include: using a quantization parameter calculated by the video encoder 20 for each video block in the video slice, to determine a degree of quantization that should be applied and, likewise, a degree of inverse quantization that should be applied.

The inverse transform processing unit 312 is configured to apply an inverse transform (for example, an inverse DCT, an inverse integer transform, or a conceptually similar inverse transform process) to a transform coefficient, to generate a residual block in a pixel domain.

The reconstruction unit 314 (for example, the summator 314) is configured to add an inverse transform block 313 (that is, a reconstructed residual block 313) to the prediction block 365, for example, by adding a sample value of the reconstructed residual block 313 and a sample value of the prediction block 365, to obtain a reconstructed block 315 in a sample domain.

The loop filter unit 320 (during a coding loop or after a coding loop) is configured to filter the reconstructed block 315 to obtain a filtered block 321, to smooth pixel transition or improve video quality. In an example, the loop filter unit 320 may be configured to perform any combination of filtering technologies described below. The loop filter unit 320 is intended to represent one or more loop filters, for example, a deblocking filter, a sample-adaptive offset (SAO) filter, or another filter such as a bilateral filter, an adaptive loop filter (ALF), a sharpening or smoothing filter, or a collaborative filter. Although the loop filter unit 320 is shown as an in-loop filter in FIG. 3, in another configuration, the loop filter unit 320 may be implemented as a post-loop filter.

A decoded video block 321 in a given frame or picture is then stored in the decoded picture buffer 330 that stores a reference picture used for subsequent motion compensation.

The decoder 30 is configured to, for example, output a decoded picture 31 through an output 332, for presentation to a user or viewing by a user.

Another variant of the video decoder 30 may be configured to decode a compressed bitstream. For example, the decoder 30 may generate an output video bitstream without the loop filter unit 320. For example, a non-transform based decoder 30 may directly inverse-quantize a residual signal without the inverse transform processing unit 312 for some blocks or frames. In another implementation, the video decoder 30 may have the inverse quantization unit 310 and the inverse transform processing unit 312 that are combined into a single unit.

Specifically, in this embodiment of the present disclosure, the decoder 30 is configured to implement a non-separable transform method described in the following embodiments.

It should be understood that another structural variant of the video decoder 30 may be configured to decode an encoded video bitstream. For example, the video decoder 30 may generate an output video bitstream without processing by the filter 320. Alternatively, for some picture blocks or picture frames, the entropy decoding unit 304 of the video decoder 30 does not obtain quantized coefficients through decoding, and correspondingly, processing by the inverse quantization unit 310 and the inverse transform processing unit 312 is not required. The loop filter 320 is optional, and in a case of lossless compression, the inverse quantization unit 310 and the inverse transform processing unit 312 are optional. It should be understood that, according to different application scenarios, the inter prediction unit and the intra prediction unit may be selectively enabled.

It should be understood that on the encoder 20 and the decoder 30 in this application, a processing result for a procedure may be output to a next procedure after being further processed. For example, after a procedure such as interpolation filtering, motion vector derivation, or loop filtering, an operation such as clip or shift (shift) is further performed on a processing result of the corresponding procedure.

Figure 4:
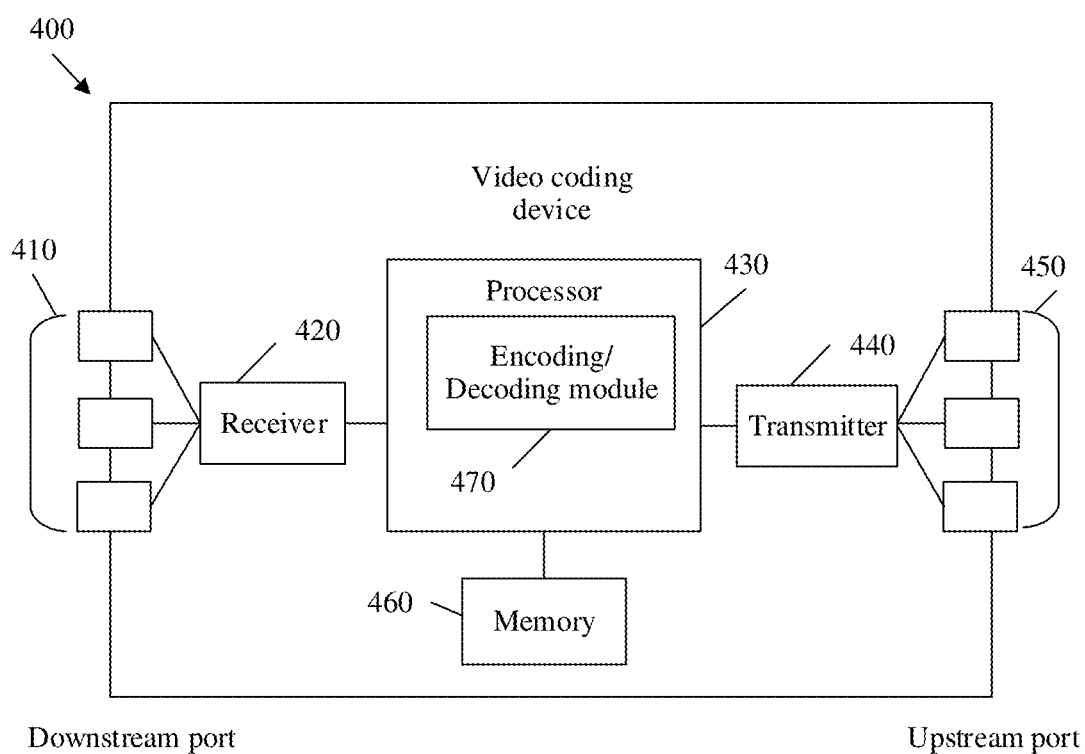
FIG. 4 is a block diagram of an example of a video coding device 400 for implementing an embodiment of the present disclosure.

FIG. 4 is a schematic diagram of a structure of a video coding device 400 (for example, a video encoding device 400 or a video decoding device 400) according to an embodiment of the present disclosure. The video coding device 400 is suitable for implementing the embodiments described in this specification. In an embodiment, the video coding device 400 may be a video decoder (for example, the decoder 30 in FIG. 1A) or a video encoder (for example, the encoder 20 in FIG. 1A). In another embodiment, the video coding device 400 may be one or more components of the decoder 30 in FIG. 1A or the encoder 20 in FIG. 1A.

The video coding device 400 includes: an ingress port 410 and a receiver unit (Rx) 420 for receiving data; a processor, a logic unit, or a central processing unit (CPU) 430 for processing data; a transmitter unit (Tx) 440 and an egress port 450 for transmitting data; and a memory 460 for storing data. The video coding device 400 may further include an optical-to-electrical conversion component and an electrical-to-optical (EO) component that are coupled to the ingress port 410, the receiver unit 420, the transmitter unit 440, and the egress port 450 for egress or ingress of optical or electrical signals.

The processor 430 is implemented by using hardware and software. The processor 430 may be implemented as one or more CPU chips, cores (for example, a multi-core processor), FPGAs, ASICs, and DSPs. The processor 430 communicates with the ingress port 410, the receiver unit 420, the transmitter unit 440, the egress port 450, and the memory 460. The processor 430 includes a coding module 470 (for example, an encoding module 470 or a decoding module 470). The encoding/decoding module 470 implements the embodiments disclosed in this specification, to implement the non-separable transform method provided in the embodiments of the present disclosure. For example, the encoding/decoding module 470 implements, processes, or provides various coding operations. Therefore, the encoding/decoding module 470 provides a substantial improvement to a function of the video coding device 400 and affects transform of the video coding device 400 to a different state. Alternatively, the encoding/decoding module 470 is implemented as instructions stored in the memory 460 and executed by the processor 430.

The memory 460 includes one or more disks, tape drives, and solid-state drives, and may be used as an overflow data storage device, to store programs when such programs are selected for execution, and to store instructions and data that are read during program execution. The memory 460 may be volatile and/or non-volatile, and may be a read-only memory (ROM), a random access memory (RAM), a ternary content-addressable memory (ternary content-addressable memory, TCAM), and/or a static random access memory (SRAM).

Figure 5:
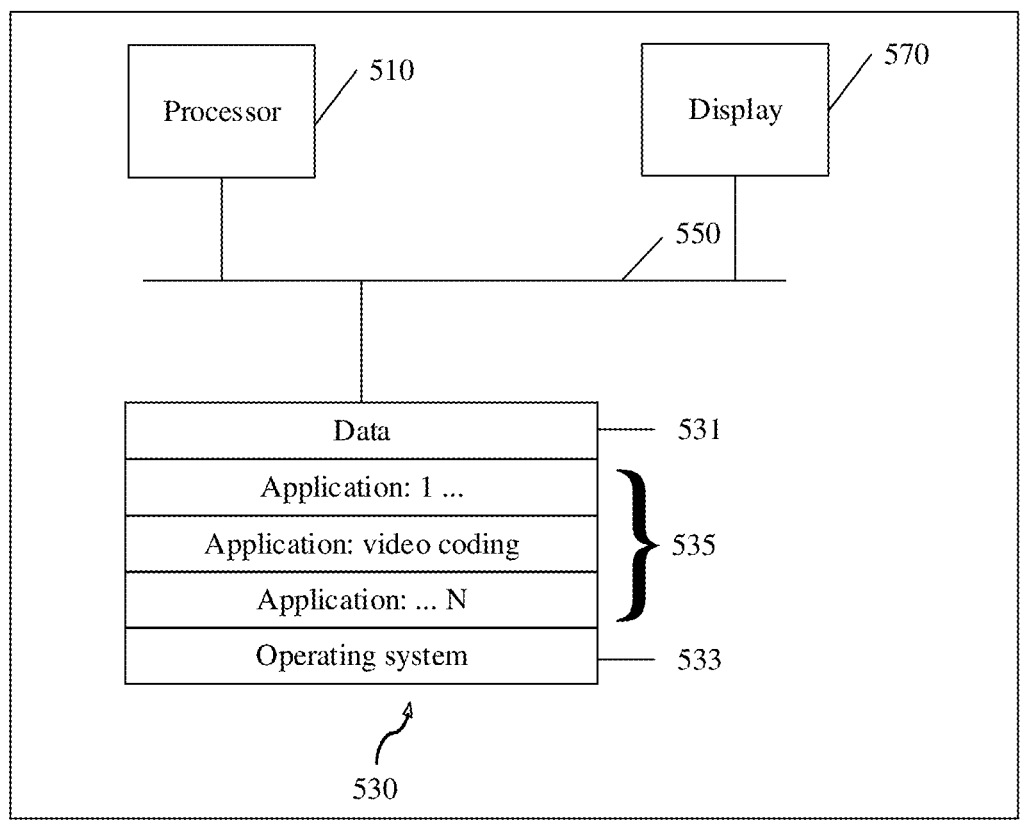
FIG. 5 is a block diagram of another example of an encoding apparatus or a decoding apparatus for implementing an embodiment of the present disclosure.

FIG. 5 is a simplified block diagram of an apparatus 500 that may be used as either or both of the source device 12 and the destination device 14 in FIG. 1A according to an example embodiment. The apparatus 500 may implement the technologies of this application. In other words, FIG. 5 is a schematic block diagram of an implementation of an encoding device or a decoding device (a coding device 500 for short) according to an embodiment of this application. The coding device 500 may include a processor 510, a memory 530, and a bus system 550. The processor and the memory are connected through the bus system. The memory is configured to store instructions. The processor is configured to execute the instructions stored in the memory. The memory of the coding device stores program code. The processor may invoke the program code stored in the memory, to perform various video encoding or decoding methods described in this application, and in particular, various non-separable transform methods. To avoid repetition, details are not described herein.

In this embodiment of this application, the processor 510 may be a central processing unit ("CPU" for short), or the processor 510 may be another general-purpose processor, a digital signal processor (DSP), an application-specific integrated circuit (ASIC), a field programmable gate array (FPGA), or another programmable logic device, discrete gate or transistor logic device, discrete hardware component, or the like. The general-purpose processor may be a microprocessor, or the processor may be any conventional processor or the like.

The memory 530 may include a read-only memory (ROM) device or a random access memory (RAM) device. Any other suitable type of storage device may alternatively be used as the memory 530. The memory 530 may include code and data 531 that are accessed by the processor 510 through the bus system 550. The memory 530 may further include an operating system 533 and an application program 535. The application program 535 includes at least one program that allows the processor 510 to perform the video encoding or decoding method described in this application (in particular, the non-separable transform method described in this application). For example, the application program 535 may include applications 1 to N, and further includes a video encoding or decoding application (briefly referred to as a video coding application) that is used to perform the video encoding or decoding method described in this application.

The bus system 550 may further include a power bus, a control bus, a status signal bus, and the like, in addition to a data bus. However, for clear description, various types of buses in the figure are marked as the bus system 550.

Optionally, the coding device 500 may further include one or more output devices, for example, a display 570. In an example, the display 570 may be a touch-sensitive display that combines a display and a touch-sensitive unit that is operable to sense a touch input. The display 570 may be connected to the processor 510 through the bus 550.

The following describes in detail the solutions in the embodiments of this application.

In the H.265/H.266 video coding standard, a frame of picture is partitioned into non-overlapping coding tree units (CTU). The size of the CTU may be set to 64×64 (the size of the CTU may alternatively be set to another value, for example, the size of the CTU in JVET reference software JEM is increased to 128×128 or 256×256). A 64×64 CTU includes a rectangular pixel matrix with 64 columns and 64 pixels per column. A pixel may include only a luma component, or may include a luma component (referred to as Y) and two chroma components (referred to as Cb and Cr). A luma component of a pixel is referred to as a luma pixel for short, and a chroma component of a pixel is referred to as a chroma pixel for short.

A quadtree (quadtree, QT for short) based CTU split mode is used in H.265/H.266. A CTU is used as a root (root) node of a quadtree, and the CTU is recursively split into several leaf nodes (leaf nodes) in the quadtree split mode. One node corresponds to one picture region. If a node is not split, the node is referred to as a leaf node, and a picture region corresponding to the node forms one CU. If a node is further split, a picture region corresponding to the node is split into four equal-sized regions (the length and the width of each of the four regions are respectively half of the length and the width of the split region), and each region corresponds to one node. Whether these nodes are to be further split needs to be separately determined.

After a node is parsed to be a leaf node, the leaf node is a CU, coding information (including information such as a prediction mode and a transform coefficient of the CU, for example, a coding_unit( ) syntax structure in H.265) corresponding to the CU is further parsed. Then, decoding processing such as prediction, inverse quantization, inverse transform, and loop filtering is performed on the CU based on the coding information, to generate a reconstructed picture corresponding to the CU.

Quantized transform coefficients of a luma block of a CU are dequantized to constitute a two-dimensional transform coefficient matrix A, and inverse transform is performed on the two-dimensional transform coefficient matrix A to generate a luma transform block, where the luma transform block includes a reconstructed residual pixel of the luma block. The luma transform block is also a two-dimensional matrix. The luma transform block and a luma prediction block are superposed, to generate a reconstructed pixel of the luma block. To reduce complexity, two-dimensional transform usually uses two-dimensional separable transform (2D separable transform), and the two-dimensional separable transform (for example, two-dimensional DCT-2) may be decomposed into vertical transform and horizontal transform. Specific processing includes: performing column transform on the two-dimensional transform coefficient matrix A corresponding to the luma block, to generate a two-dimensional matrix B, where the column transform is also referred to as vertical transform; and performing row transform on the two-dimensional matrix B, to obtain a two-dimensional matrix C, where the row transform is also referred to as horizontal transform, and the two-dimensional matrix C is the luma transform block. A transform processing method for a chroma block is the same as a transform processing method for the luma block, and details are not described again. Row transform and column transform processing further includes: performing clipping processing on elements in a transformed matrix, to limit the elements to a range. If transform is non-separable transform (non-separable transform), transform processing usually needs to be completed through multiplication of matrices of a large size, and computational complexity is higher than that of separable transform.

In an encoding process, processing such as converting an original residual pixel into a transform coefficient through transform is referred to as forward transform. In a decoding process, processing such as converting a transform coefficient into a reconstructed residual pixel through transform is referred to as inverse transform. Vertical transform in the forward transform and vertical transform in the inverse transform have a forward and inverse transform relationship. For example, if the vertical transform in the forward transform is forward DCT-2, the vertical transform in the inverse transform is inverse DCT-2. Similarly, horizontal transform in the forward transform and horizontal transform in the inverse transform have a forward and inverse transform relationship. Similarly, non-separable transform may also be classified into forward transform and inverse transform.

In a current method for further transforming a primary transform coefficient of a prediction residual through secondary transform, a complexity of calculating a secondary transform index value is high. This affects an entropy coding throughput. In addition, because the secondary transform is non-separable transform, a secondary transform matrix occupies large storage space.

An embodiment of the present disclosure provides a "low frequency non-separable transform" (LFNST) method 600. As shown in FIG. 6, the following steps are included.

Step 602: Parse a transform coefficient of a transform block in a current coding unit, to obtain a first transform coefficient matrix.

If the current coding unit includes a luma transform block and a chroma transform block, one luma transform coefficient matrix and two chroma transform coefficient matrices are obtained. If the current coding unit includes only a luma transform block, one luma transform coefficient matrix is obtained. If the current coding unit includes only a chroma transform block, two chroma transform coefficient matrices are obtained. The width of the luma transform coefficient matrix is WL, and the height of the luma transform coefficient matrix is HL. The width of the chroma transform coefficient matrix is WC, and the height of the chroma transform coefficient matrix is HC.

Step 604: If a total quantity of non-zero transform coefficients in a top-left preset region B of the first transform coefficient matrix exceeds a threshold T, and all transform coefficients in a preset region A of the transform coefficient matrix are 0, LFNST is allowed for the current coding unit, and an index value is parsed from a bitstream. Otherwise, LFNST is not allowed for the current coding unit, and an index value is 0 by default. The index value equal to 0 specifies that the LFNST is not used for the current coding unit. The index value equal to 1 or 2 specifies that the LFNST is used for the current coding unit.

The top-left preset region B is less than a region of the first transform coefficient matrix, for example, may be a top-left 4×4 region.

For example, the top-left preset region B is a rectangular region, where the width of the rectangular region is W1 and the height of the rectangular region is H1, W1 is less than or equal to 4, and H1 is less than or equal to 4. For example, W1=H1=2. For another example, when the width or the height of the transform coefficient matrix is equal to 2, W1=H1=2; otherwise, W1=H1=4.

For another example, the top-left preset region B is a triangular region including three positions (0, 0), (0, 1), and (1, 0). For another example, the top-left preset region B is a triangular region including six positions (0, 0), (0, 1), (1, 0), (0, 2), (1, 1), and (2, 0).

The preset region A in the transform coefficient matrix is related to the width and the height of the transform coefficient matrix. When the transform coefficient matrix is 4×4, the preset region A includes coefficients 8 to 15 in a coefficient scan order. When the transform coefficient matrix is 8×8, the preset region A includes coefficients 8 to 47 in the coefficient scan order. When the transform coefficient matrix is 8×N or N×8 (N≥16), the preset region A includes coefficients 16 to 47 in the coefficient scan order. For a transform coefficient matrix of another size, the preset region A is not set. For example, the coefficient scan order is a diagonal scan order in HEVC.

Figures 8, 9:
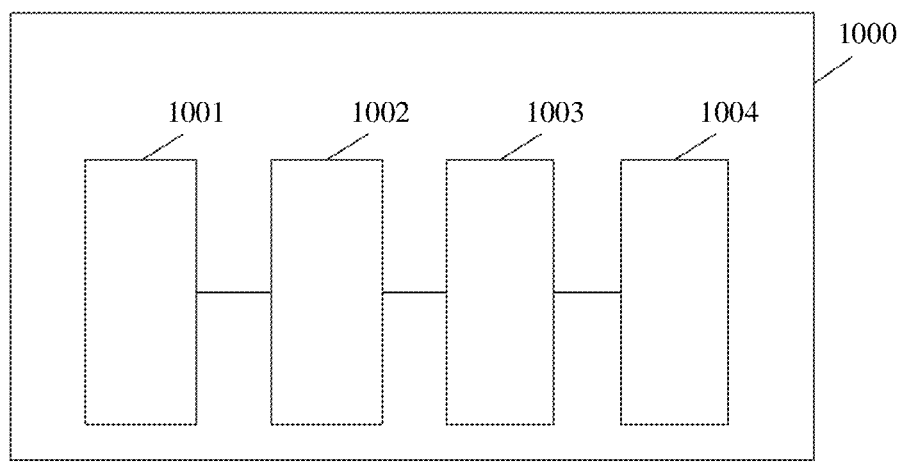
FIG. 8 shows a diagonal scan order of an 8×8 transform coefficient matrix.
FIG. 9 is a block diagram of a structure of a device for implementing an embodiment of the present disclosure.

Diagonal scan orders of 4×4 and 4×2 transform coefficient matrices are shown in FIG. 7. A number at each position indicates a number of a coefficient in the diagonal scan order. For example, for the 4×4 transform coefficient matrix, a coefficient 0 is located at a position (0, 0), a coefficient 1 is located at a position (0, 1), and a coefficient 15 is located at a position (3, 3). For the 4×2 transform coefficient matrix, a coefficient 7 is located at a position (3, 1). An 8×8 transform coefficient matrix may be divided into four 4×4 transform coefficient groups (CGs), and a diagonal scan order is used for each 4×4 transform coefficient group internally, as shown in FIG. 8.

If the current coding unit includes a luma transform block and a chroma transform block, the threshold T is 2. If the current coding unit includes only a luma transform block or only a chroma transform block, the threshold T is 1.

In another optional implementation, if the total quantity of all the non-zero transform coefficients in the top-left preset region B of the transform coefficient matrix in the current coding unit exceeds the threshold T, and all the transform coefficients in the preset region A of the transform coefficient matrix are 0, the LFNST is allowed for the current coding unit; whether the index value is located in a first set or a second set is further determined based on the width and height of the transform coefficient matrix, where the first set includes only two values, and the second set includes only three values; and then the index value is parsed from the bitstream.

A transform set corresponding to the first set includes one transform matrix, and the values of the first set include 0 and 1; and a transform set corresponding to the second set includes two transform matrices, and the values of the second set include 0, 1, and 2, where 0 indicates that the LFNST method is not used, 1 indicates that a matrix 0 in the transform set is used as the transform matrix, and 2 indicates that a matrix 1 in the transform set is used as the transform matrix.

When the current coding unit is a chroma coding unit, if both the width and the height of the chroma transform coefficient matrix are greater than a fixed value, for example, 4, an M2×N2 transform matrix is used, and the index value is 0 or 1. Otherwise (in this case, an M1×N1 transform matrix is used), the index value is 0, 1, or 2. The chroma transform coefficient matrix is the first transform coefficient matrix.

When the current coding unit is a luma-chroma coding unit or a luma coding unit, if both the width and the height of the luma transform coefficient matrix are greater than 4, the index value is 0 or 1. Otherwise, the index value is 0, 1, or 2.

Because a storage amount required for the M2×N2 transform matrix is three times that for the M1×N1 transform matrix, and in this manner, the size of the M2×N2 transform matrix is reduced by half, and therefore a total storage amount of the transform matrix may be reduced by about ⅜.

The index may be binarized into two bins (bins). A first bin indicates whether to use the LFNST, and a second bin indicates whether to use a transform matrix 1 in the transform set. When the index value is 0 or 1, the second bin is not present in the bitstream and is 0 by default.

Step 606: If the index value is not 0, determine the transform matrix based on an intra prediction mode corresponding to the transform block, the width and the height of the transform block, and the index value.

The transform matrix has two sizes: M1×N1 and M2×N2. To reduce a quantity of transform matrices to save storage space, three transform sets are used in this embodiment of the present disclosure. Correspondingly, a method for determining a number of the transform set based on the intra prediction mode corresponding to the transform block also changes. Each transform set includes two transform matrices (referred to as a transform matrix 0 and a transform matrix 1). In other words, there are three transform sets including the M1×N1 matrix, and there are three transform sets including the M2×N2 matrix. N1, N2, M1, and M2 are positive integers, for example, N1=16, N2=16, M1=16, and M2=48.

When the width or the height of the transform block is equal to 4, the transform set including the M1×N1 matrix is selected. Otherwise (to be specific, both the width and the height of the transform block are greater than 4), the transform set including the M2×N2 matrix is selected.

The number of the transform set is determined based on the intra prediction mode corresponding to the transform block. A transform matrix that corresponds to the index value and that is in the transform set corresponding to the number of the transform set is determined based on the index value, and is to be used for a matrix multiplication operation in step 608.

The method for determining the number of the transform set based on the intra prediction mode corresponding to the transform block is as follows.

If the intra prediction mode is one of a direct current (DC) prediction mode, a planar (Planar) prediction mode, and a cross-component linear model (cross-component linear model, CCLM) prediction mode, the number of the transform set is 0.

If the intra prediction mode is a mode whose number is less than 0, a mode whose number ranges from 2 to 18, or a mode whose number ranges from 50 to 80, that is, the intra prediction mode is an angular prediction mode whose prediction angle is not between horizontal prediction and vertical prediction, the number of the transform set is 1, where the mode 18 is horizontal prediction, the mode 50 is vertical prediction, and modes 19 to 49 are angular prediction modes between horizontal prediction and vertical prediction.

If the intra prediction mode is a mode whose number ranges from 19 to 49, that is, the intra prediction mode is an angular prediction mode whose prediction angle is between horizontal prediction and vertical prediction, the number of the transform set is 2.

Step 608: Perform a matrix multiplication operation on a one-dimensional vector V that is constituted by N transform coefficients in the top-left preset region B of the transform coefficient matrix and the transform matrix TR determined in step 606, to obtain M transform coefficients COF (as shown in a formula 1), and place the N transform coefficients at corresponding positions in the top-left preset region of the transform coefficient matrix in a transform coefficient scan order, to obtain a second transform coefficient matrix.

More specifically, if the size of the transform matrix is M1×N1, M is equal to M1, and N is equal to N1. If the size of the transform matrix is M2×N2, M is equal to M2, and N is equal to N2.

$$COF = V * TR \quad (1)$$

V represents a vector of one row and N columns, TR represents a matrix of N rows and M columns, COF represents a vector of one row and M columns, and * represents matrix multiplication.

The transform coefficient scan order is, for example, a diagonal scan order in HEVC. For example, when M is equal to 16, elements in the COF are placed in a top-left 4×4 region of the transform matrix. In the COF, a coefficient 0 is placed at a position (0, 0), a coefficient 1 is placed at a position (0, 1), a coefficient 2 is placed at a position (1, 0), a coefficient 3 is placed at a position (0, 2), a coefficient 4 is placed at a position (1, 1), a coefficient 5 is placed at a position (2, 0), a coefficient 6 is placed at a position (0, 3), a coefficient 7 is placed at a position (1, 2), . . . , and so on, as shown in FIG. 7 and FIG. 8.

It should be noted that when the intra prediction mode is a mode having a preset value (for example, a number of the mode is greater than 34 and less than 67), transpose processing further needs to be performed on coefficients in a top-left 4×4 or 8×8 region of the transform coefficient matrix.

Step 610: Perform inverse transform on the transform coefficient matrix, to obtain a residual.

The inverse transform in this step is two-dimensional separable transform. For example, there are the following five combinations of horizontal transform and vertical transform: DCT-2/DCT-2, DST-7/DST-7, DST-7/DCT-8, DCT-8/DST-7, and DCT-8/DCT-8, where DST-7/DCT-8 indicates that horizontal transform is DST-7 and vertical transform is DCT-8.

The residual may be added to a predicted pixel of the current coding unit, to obtain a reconstructed pixel of the current coding unit. Loop filtering processing may be further performed on the reconstructed pixel.

According to this embodiment of the present disclosure, complexity of obtaining non-zero coefficients is reduced in step 604, and furthermore, a quantity of transform matrices is reduced in step 606. This reduces a storage amount. By implementing this application, a quantity of transform matrices used for non-separable transform can be reduced to some extent, a calculation amount for parsing a non-separable transform index value can be reduced, and a coding throughput can be increased.

Based on a same inventive concept as that of the foregoing method, as shown in FIG. 9, an embodiment of the present disclosure further provides a device 1000. The device 1000 includes a parsing module 1001, a determining module 1002, an updating module 1003, and an inverse transform module 1004.

The parsing module 1001 is configured to parse a transform coefficient of a transform block in a current coding unit, to obtain a first transform coefficient matrix; obtain a quantity K of non-zero transform coefficients in a top-left preset region of the first transform coefficient matrix, where the top-left preset region is less than a region of the first transform coefficient matrix; and if the quantity K is greater than a threshold, parse an index value.

The determining module 1002 is configured to determine a transform matrix based on the index value.

The updating module 1003 is configured to multiply N transform coefficients of the first transform coefficient matrix by the transform matrix, to obtain M transform coefficients; and update the first transform coefficient matrix by using the M transform coefficients, to obtain a second transform coefficient matrix.

The inverse transform module 1004 is configured to perform inverse transform on the second transform coefficient matrix, to obtain a residual.

It should be noted that the parsing module 1001, the determining module 1002, the updating module 1003, and the inverse transform module 1004 may be applied to an inter prediction process at an encoder side or a decoder side. Specifically, on the encoder side, the modules may be used in the inter prediction unit 244 in the prediction processing unit 260 of the encoder 20; and on the decoder side, the modules may be used in the inter prediction unit 344 in the prediction processing unit 360 of the decoder 30.

It should be further noted that, for specific implementation processes of the parsing module 1001, the determining module 1002, the updating module 1003, and the inverse transform module 1004, refer to the detailed description of the embodiment in FIG. 6. For brevity of this specification, details are not described herein again.

A person skilled in the art can understand that, the functions described with reference to various illustrative logical blocks, modules, and algorithm steps disclosed and described in this specification can be implemented by using hardware, software, firmware, or any combination thereof. If software is used for implementation, the functions described with reference to the illustrative logical blocks, modules, and steps may be stored in or transmitted over a computer-readable medium as one or more instructions or code and executed by a hardware-based processing unit. The computer-readable medium may include a computer-readable storage medium. The computer-readable storage medium corresponds to a tangible medium such as a data storage medium, or a communications medium including any medium that facilitates transfer of a computer program from one place to another place (for example, according to a communications protocol). In this manner, the computer-readable medium may generally correspond to: (1) a non-transitory tangible computer-readable storage medium, or (2) a communications medium such as a signal or a carrier. The data storage medium may be any usable medium that can be accessed by one or more computers or one or more processors to retrieve instructions, code, and/or data structures for implementing the technologies described in this application. A computer program product may include the computer-readable medium.

By way of example but not limitation, such computer-readable storage medium may include a RAM, a ROM, an EEPROM, a CD-ROM or another optical disc storage apparatus, a magnetic disk storage apparatus or another magnetic storage apparatus, a flash memory, or any other medium that can be used to store desired program code in a form of an instruction or a data structure and that can be accessed by a computer. In addition, any connection is properly referred to as a computer-readable medium. For example, if instructions are transmitted from a website, a server, or another remote source through a coaxial cable, an optical fiber, a twisted pair, a digital subscriber line (DSL), or wireless technologies such as infrared, radio, and microwave, the coaxial cable, the optical fiber, the twisted pair, the DSL, or the wireless technologies such as infrared, radio, and microwave are included in a definition of the medium. However, it should be understood that the computer-readable storage medium and the data storage medium do not include connections, carriers, signals, or other transitory media, but actually mean non-transitory tangible storage media. Disks and discs used in this specification include a compact disc (CD), a laser disc, an optical disc, a digital versatile disc (DVD), and a Blu-ray disc. The disks usually reproduce data magnetically, whereas the discs reproduce data optically with lasers. Combinations of the foregoing items should also be included in the scope of the computer-readable medium.

Instructions may be executed by one or more processors such as one or more digital signal processors (DSPs), general-purpose microprocessors, application-specific integrated circuits (ASICs), field programmable gate arrays (FPGAs), or other equivalent integrated circuits or discrete logic circuits. Therefore, the term "processor" used in this specification may refer to the foregoing structure, or any other structure suitable for implementing the technologies described in this specification. In addition, in some aspects, the functions described with reference to the illustrative logical blocks, modules, and steps described in this specification may be provided within dedicated hardware and/or software modules configured for encoding and decoding, or may be incorporated into a combined codec. In addition, the technologies may be all implemented in one or more circuits or logic elements.

The technologies in this application may be implemented in various apparatuses or devices, including a wireless handset, an integrated circuit (IC), or a set of ICs (for example, a chip set). Various components, modules, or units are described in this application to emphasize functional aspects of the apparatuses configured to perform the disclosed technologies, but are not necessarily implemented by using different hardware units. Actually, as described above, various units may be combined into a codec hardware unit in combination with appropriate software and/or firmware, or may be provided by interoperable hardware units (including one or more processors described above).

In the foregoing embodiments, descriptions of the embodiments have respective focuses. For a part that is not described in detail in an embodiment, refer to related descriptions in other embodiments.

The foregoing descriptions are merely specific example implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
    parsing, by a processor, a transform coefficient of a transform block in a current coding unit to obtain a first transform coefficient matrix;
    obtaining a quantity K of non-zero transform coefficients in a top-left preset region of the first transform coefficient matrix, wherein a size of the top-left preset region is less than a size of the first transform coefficient matrix;
    parsing an index value based on the quantity K being greater than a threshold;
    determining a transform matrix based on the index value;
    multiplying N transform coefficients of the first transform coefficient matrix by the transform matrix to obtain M transform coefficients;
    updating the first transform coefficient matrix by using the M transform coefficients to obtain a second transform coefficient matrix; and
    performing an inverse transform on the second transform coefficient matrix to obtain residual samples of the current coding unit.

2. The method according to claim 1, wherein the top-left preset region is a rectangular region, wherein a width of the rectangular region is W and a height of the rectangular region is H, W is less than or equal to 4, and H is less than or equal to 4.

3. The method according to claim 2, wherein the size of the top-left preset region is 4×4 or 2×2.

4. The method according to claim 1, wherein the top-left preset region is a triangular region.

5. The method according to claim 1, wherein the top-left preset region is a triangular region comprising three positions (0, 0), (0, 1), and (1, 0) in a two-dimensional plane, or the top-left preset region is a triangular region comprising six positions (0, 0), (0, 1), (1, 0), (0, 2), (1, 1), and (2, 0) in a two-dimensional plane.

6. The method according to claim 1, wherein the method further comprises:
    determining, based on an intra prediction mode corresponding to the transform block, a transform set in which the transform matrix is located; and
    the determining a transform matrix based on the index value comprises:
        determining the transform matrix based on a number of the transform set and the index value, wherein the number of the transform set is only one of three values.

7. The method according to claim 6, wherein the number of the transform set is 0, 1, or 2;
    the number of the transform set is 0 when the intra prediction mode is one of a direct current prediction mode, a planar prediction mode, or a cross-component linear model prediction mode;
    the number of the transform set is 1 when the intra prediction mode is a mode having a number that is less than 0, a mode having a number that ranges from 2 to 18, or a mode having a number that ranges from 50 to 80; and
    the number of the transform set is 2 when the intra prediction mode is a mode having a number that ranges from 19 to 49.

8. The method according to claim 1, wherein before the parsing an index value, the method further comprises:
    determining, based on a width and a height of the first transform coefficient matrix, whether the index value is located in a first set or a second set, wherein the first set comprises only two values, and the second set comprises only three values.

9. The method according to claim 8, wherein
    when the current coding unit is a chroma coding unit and both a width and a height of a chroma transform coefficient matrix are greater than 4, the index value is located in the first set, and the chroma transform coefficient matrix is the first transform coefficient matrix; or when the current coding unit is a chroma coding unit and a width or a height of a chroma transform coefficient matrix is not greater than 4, the index value is located in the second set.

10. The method according to claim 8, wherein
when the current coding unit is a luma coding unit or a luma-chroma coding unit and both a width and a height of a luma transform coefficient matrix are greater than 4, the index value is located in the first set, and the luma transform coefficient matrix is the first transform coefficient matrix; or
when the current coding unit is a luma coding unit or a luma-chroma coding unit and a width or a height of a luma transform coefficient matrix is not greater than 4, the index value is located in the second set.

11. The method according to claim 8, wherein
a transform set corresponding to the first set comprises one transform matrix, and values of the first set comprise 0 and 1; and
a transform set corresponding to the second set comprises two transform matrices, and values of the second set comprise 0, 1, and 2,
wherein 0 indicates that a low frequency non-separable transform method is not used, 1 indicates that a first matrix in the transform set is used as the transform matrix, and 2 indicates that a second matrix in the transform set is used as the transform matrix.

12. The method according to claim 1, wherein the method further comprises:
determining, based on a width and a height of the transform block, whether to use an M1×N1 transform matrix or an M2×N2 transform matrix, wherein a quantity of M2×N2 transform matrices is less than a quantity of M1×N1 transform matrices.

13. A method, comprising:
parsing, by a processor, a transform coefficient of a transform block in a current coding unit to obtain a first transform coefficient matrix;
obtaining a quantity K of non-zero transform coefficients in the first transform coefficient matrix;
parsing an index value based on the quantity K being greater than a threshold;
determining, based on an intra prediction mode corresponding to the transform block, a transform set in which a transform matrix is located, wherein a number of the transform set is only one of three values;
determining the transform matrix based on the index value and the number of the transform set;
multiplying N transform coefficients of the first transform coefficient matrix by the transform matrix to obtain M transform coefficients;
updating the first transform coefficient matrix by using the M transform coefficients to obtain a second transform coefficient matrix; and
performing an inverse transform on the second transform coefficient matrix to obtain residual samples of the current coding unit.

14. The method according to claim 13, wherein the number of the transform set is 0, 1, or 2;
the number of the transform set is 0 when the intra prediction mode is one of a direct current prediction mode, a planar prediction mode, or a cross-component linear model prediction mode;
the number of the transform set is 1 when the intra prediction mode is a mode having a number that is less than 0, a mode having a number that ranges from 2 to 18, or a mode having a number that ranges from 50 to 80; and
the number of the transform set is 2 when the intra prediction mode is a mode having a number that ranges from 19 to 49.

15. The method according to claim 13, wherein the obtaining a quantity K of non-zero transform coefficients in the first transform coefficient matrix comprises:
obtaining a quantity K of non-zero transform coefficients in a top-left preset region of the first transform coefficient matrix, wherein a size of the top-left preset region is less than a size of the first transform coefficient matrix.

16. The method according to claim 15, wherein
the top-left preset region is a rectangular region, and the size of the top-left preset region is 4×4 or 2×2.

17. The method according to claim 15, wherein
the top-left preset region is a triangular region comprising three positions (0, 0), (0, 1), and (1, 0) in a two-dimensional plane, or the top-left preset region is a triangular region comprising six positions (0, 0), (0, 1), (1, 0), (0, 2), (1, 1), and (2, 0) in a two-dimensional plane.

18. The method according to claim 13, wherein before the parsing an index value, the method further comprises:
determining, based on a width and a height of the first transform coefficient matrix, whether the index value is located in a first set or a second set, wherein the first set comprises only two values, and the second set comprises only three values.

19. A non-transitory computer-readable storage medium, comprising a bitstream encoded by using the method according to claim 1.

20. A video coding device, comprising:
a processor; and
a memory having instructions stored thereon that, when executed by the processor, causes the video coding device to:
parse a transform coefficient of a transform block in a current coding unit to obtain a first transform coefficient matrix;
obtain a quantity K of non-zero transform coefficients in a top-left preset region of the first transform coefficient matrix, wherein a size of the top-left preset region is less than a size of the first transform coefficient matrix;
parse an index value based on the quantity K being greater than a threshold;
determine a transform matrix based on the index value;
multiply N transform coefficients of the first transform coefficient matrix by the transform matrix to obtain M transform coefficients;
update the first transform coefficient matrix by using the M transform coefficients to obtain a second transform coefficient matrix; and
perform an inverse transform on the second transform coefficient matrix to obtain residual samples of the current coding unit.

* * * * *